(12) United States Patent
Kakutani et al.

(10) Patent No.: US 11,838,430 B2
(45) Date of Patent: Dec. 5, 2023

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventors: Naoya Kakutani, Kashiwa (JP); Hisayuki Yamauchi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/531,055

(22) Filed: Nov. 19, 2021

(65) Prior Publication Data

US 2022/0078034 A1    Mar. 10, 2022

Related U.S. Application Data

(63) Continuation of application No. 15/892,468, filed on Feb. 9, 2018, now Pat. No. 11,212,115.

(30) Foreign Application Priority Data

Feb. 17, 2017    (JP) ................................ 2017-028424

(51) Int. Cl.
  *H04L 29/06*    (2006.01)
  *G06F 21/00*    (2013.01)
          (Continued)

(52) U.S. Cl.
  CPC ............ *H04L 9/3268* (2013.01); *H04L 9/321* (2013.01); *H04L 9/3247* (2013.01);
          (Continued)

(58) Field of Classification Search
  None
  See application file for complete search history.

(56) References Cited

U.S. PATENT DOCUMENTS 7,873,827 B2    1/2011    Miyazawa
8,090,948 B2    1/2012    Sugiura
          (Continued)

FOREIGN PATENT DOCUMENTS

CN    1901447 A    1/2007
CN    101026456 A    8/2007
          (Continued)

OTHER PUBLICATIONS

Office Action issued in Japanese Appln. No. 2017-028424 dated Nov. 9, 2020.
          (Continued)

*Primary Examiner* — Lisa C Lewis
(74) *Attorney, Agent, or Firm* — ROSSI, KIMMS & McDOWELL LLP

(57) ABSTRACT

An information processing apparatus generates a public key pair in accordance with a certificate issuance request, generates a certificate signing request based on the public key pair and transmits an electronic certificate issuance request to an external apparatus. The information processing apparatus receives a response transmitted from the external apparatus as a response to the electronic certificate issuance request, obtains an electronic certificate included in the received response and causes an application to enable its use of the obtained electronic certificate.

20 Claims, 21 Drawing Sheets

(51) Int. Cl.
*H04L 9/32* (2006.01)
*H04L 9/40* (2022.01)
*H04L 9/30* (2006.01)

(52) U.S. Cl.
CPC ........ *H04L 63/0823* (2013.01); *H04L 63/126* (2013.01); *H04L 9/30* (2013.01)

(56) References Cited

U.S. PATENT DOCUMENTS

| | | | |
|---|---|---|---|
| 8,850,186 B2 | 9/2014 | Yamauchi | |
| 9,374,229 B1* | 6/2016 | Schwengler | H04L 63/0823 |
| 9,660,977 B2 | 5/2017 | Singh | |
| 10,735,195 B2* | 8/2020 | Feather | H04L 9/3271 |
| 2006/0047965 A1 | 3/2006 | Thayer | |
| 2007/0168658 A1 | 7/2007 | Yamauchi | |
| 2008/0120506 A1* | 5/2008 | Yamauchi | H04L 9/3247 |
| | | | 713/176 |
| 2009/0113543 A1* | 4/2009 | Adams | H04L 9/3271 |
| | | | 726/20 |
| 2011/0004763 A1* | 1/2011 | Sato | H04L 63/0823 |
| | | | 713/175 |
| 2011/0113239 A1 | 5/2011 | Fu | |
| 2011/0126001 A1 | 5/2011 | Fu | |
| 2011/0231662 A1* | 9/2011 | Sato | H04L 9/3268 |
| | | | 713/176 |
| 2012/0023327 A1 | 1/2012 | Nagasaki | |
| 2012/0023560 A1 | 1/2012 | Yanagi | |
| 2012/0151213 A1 | 6/2012 | Xiao | |
| 2013/0086377 A1 | 4/2013 | Cilfone et al. | |
| 2013/0238895 A1 | 9/2013 | Dixon | |
| 2014/0258709 A1* | 9/2014 | Takeda | H04L 63/0823 |
| | | | 713/156 |
| 2015/0052351 A1* | 2/2015 | Nodehi Fard Haghighi | |
| | | | H04L 63/0428 |
| | | | 713/156 |
| 2015/0095995 A1 | 4/2015 | Bhalerao | |
| 2015/0350211 A1 | 12/2015 | Burgess | |
| 2016/0142383 A1 | 5/2016 | Asano | |
| 2016/0224281 A1 | 8/2016 | Yue | |
| 2017/0005808 A1 | 1/2017 | Gunti | |
| 2018/0034646 A1* | 2/2018 | Kuramoto | H04L 9/3268 |
| 2018/0139059 A1* | 5/2018 | Jaatinen | H04L 63/18 |
| 2018/0248867 A1* | 8/2018 | Liu | H04L 9/40 |

FOREIGN PATENT DOCUMENTS

| | | |
|---|---|---|
| CN | 103824028 A | 5/2014 |
| CN | 104683101 A | 6/2015 |
| EP | 1530339 A1 | 5/2005 |
| EP | 2526647 B1 | 9/2018 |
| EP | 3413535 A1 | 12/2018 |
| JP | H06162059 A | 6/1994 |
| JP | H118619 A | 1/1999 |
| JP | H11231776 A | 8/1999 |
| JP | 2006146508 A | 6/2006 |
| JP | 2008042753 A | 2/2008 |
| JP | 2010177744 A | 8/2010 |
| JP | 2013232826 A | 11/2013 |
| JP | 2014017707 A | 1/2014 |
| JP | 2014174560 A | 9/2014 |
| JP | 2015537471 A | 12/2015 |
| JP | 5982898 B2 | 8/2016 |
| JP | 2016178458 A | 10/2016 |
| KR | 1020060006910 A | 1/2006 |
| KR | 1020080045656 A | 5/2008 |

OTHER PUBLICATIONS

Search and Examination Report issued in GB Appln. No. 1802583.3 dated Apr. 13, 2021.
Office Action issued in Korean Appln. No. 10-2018-0017362 dated Apr. 30, 2021.
Forouzan "Cryptography & Network Security" McGraw Hill Indian Edition. 2007: pp. 1-737.
Office Action issued in Chinese Appln. No. 201810150890.2 dated Jul. 23, 2021. English translation provided.
Office Action issued in U.S. Appl. No. 15/892,468 dated Jul. 30, 2020.
Office Action issued in U.S. Appl. No. 15/892,468 dated Mar. 31, 2021.
Notice of Allowance issued in U.S. Appl. No. 15/892,468 dated Sep. 8, 2021.
Search and Examination Report issued in GB Appln. No. 1802583.3 dated Sep. 27, 2019.
Search and Examination Report issued in GB Appln. No. 1802583.3 dated Apr. 22, 2020.
Combined Search and Examination Report issued in GB Application No. 1802583.3 dated Aug. 28, 2018.
Office Action issued in Chinese Appln. No. 201810150890.2 dated Aug. 5, 2019. English translation provided.

* cited by examiner

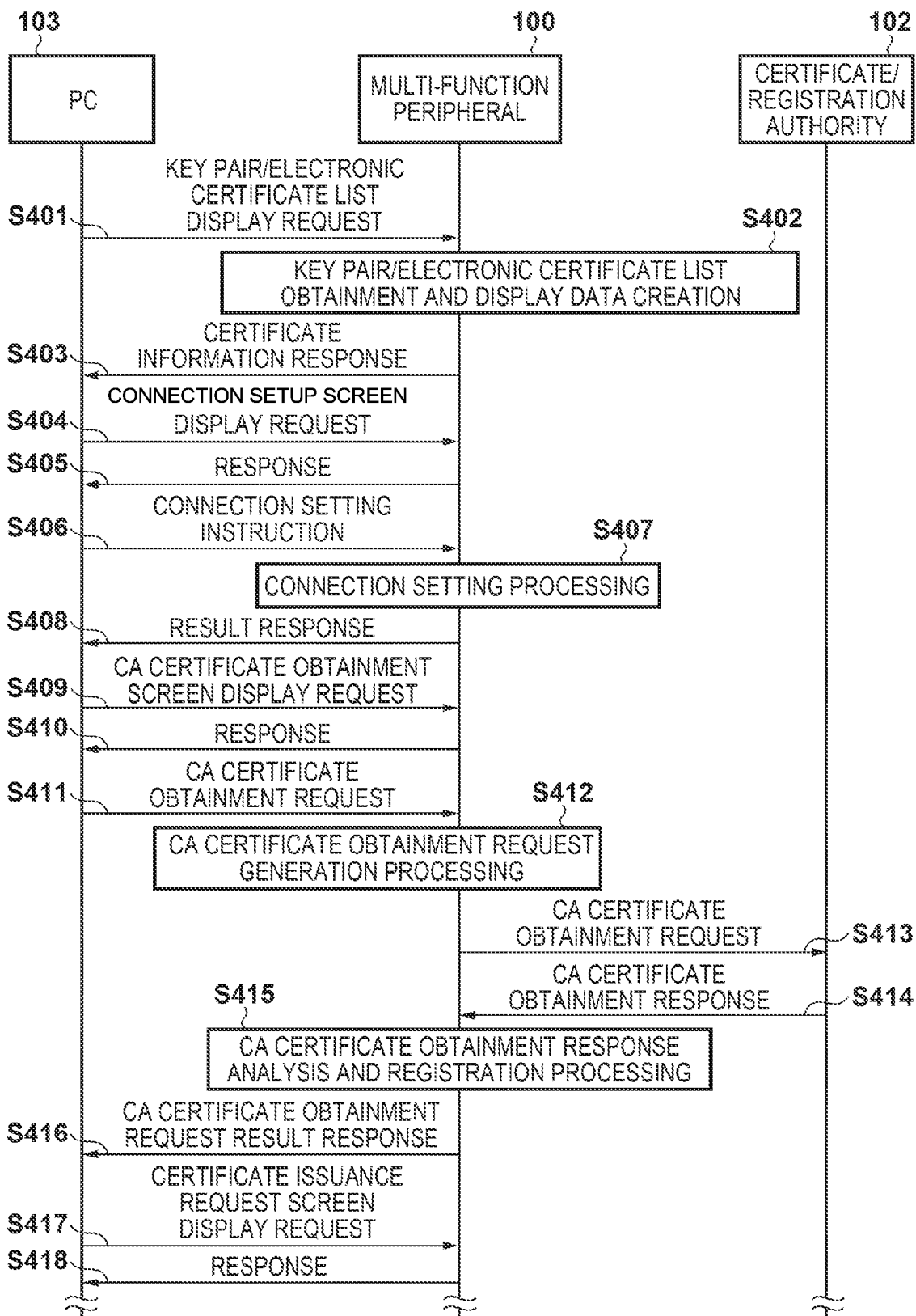

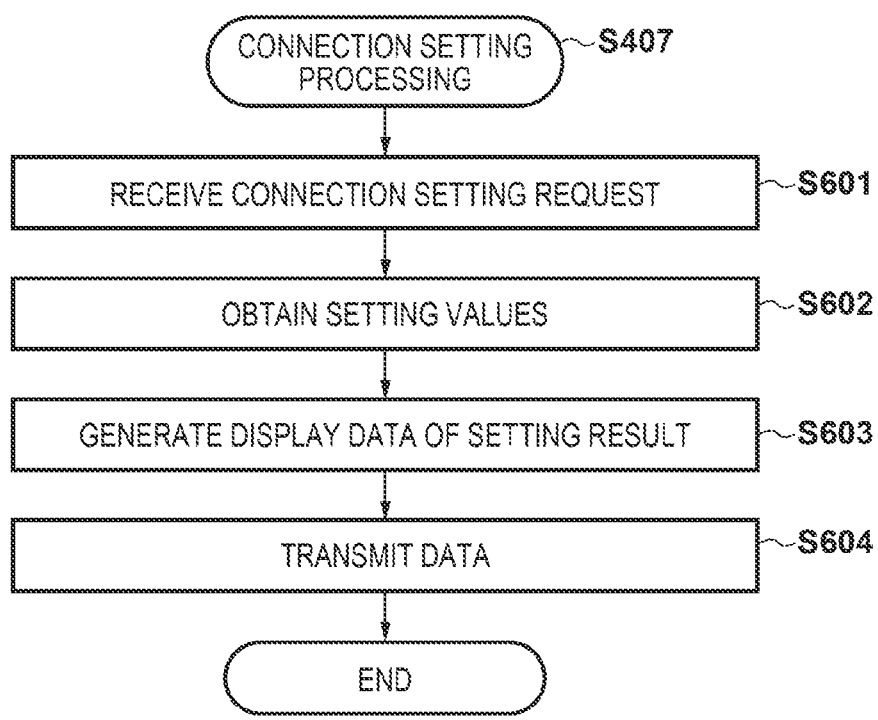

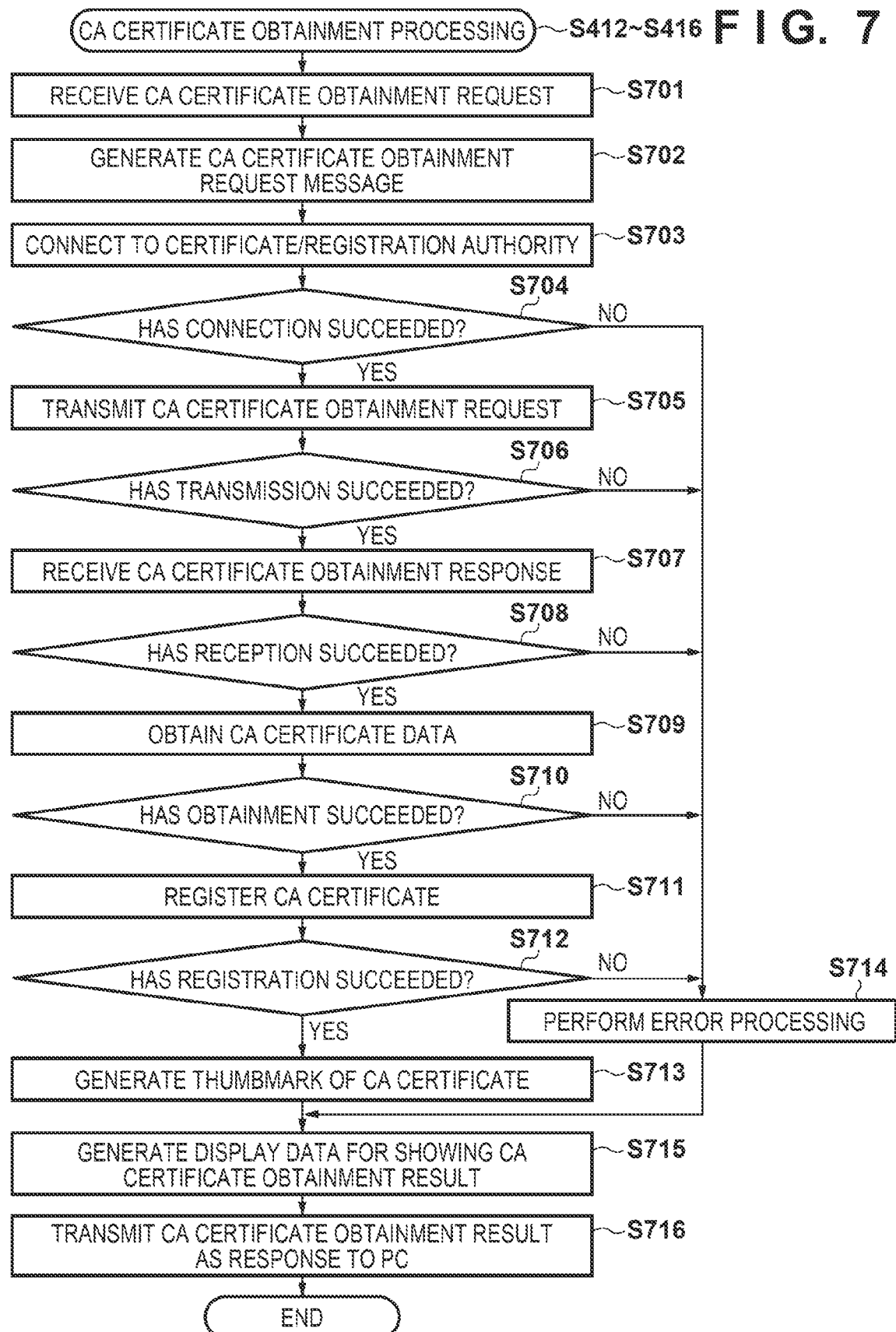

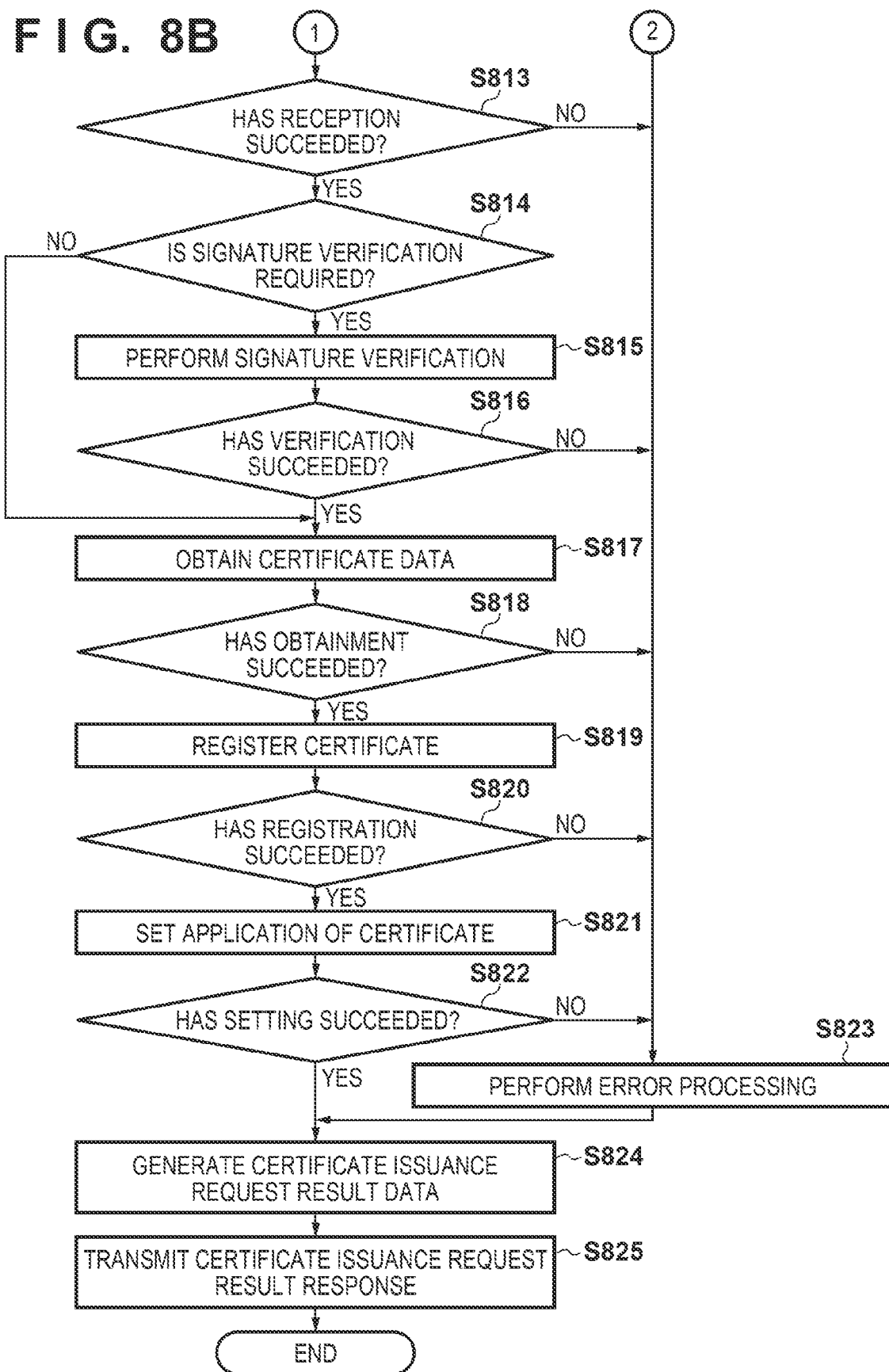

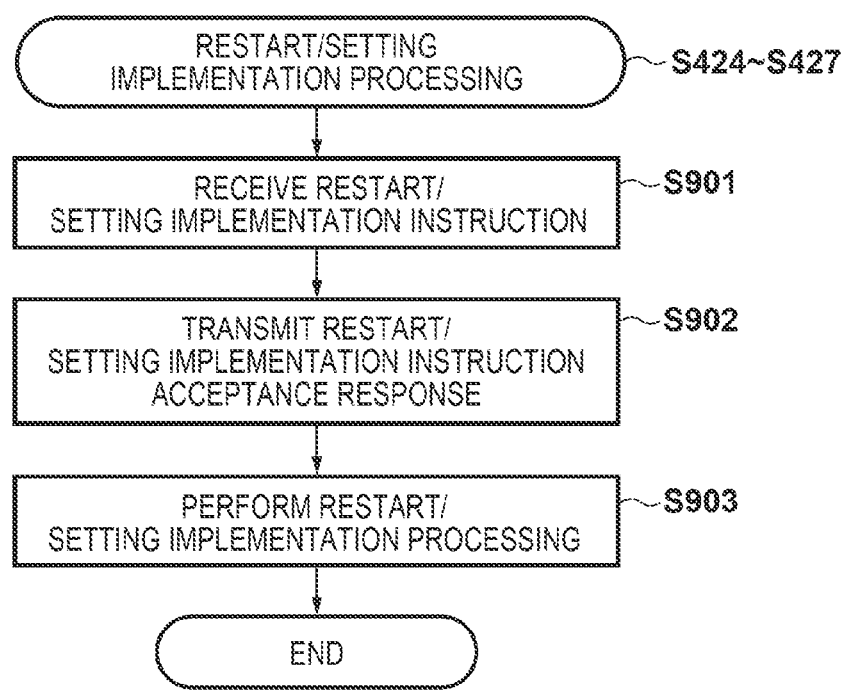

FIG. 10A

CERTIFICATE OBTAINMENT REQUEST/SETTING SCREEN

CERTIFICATE LIST — 1002
CONNECTION SETTINGS — 1003
CA CERTIFICATE OBTAINMENT — 1004
CERTIFICATE ISSUANCE REQUEST

CERTIFICATE LIST

| NAME (1011) | APPLICATION (1012) | ISSUER (1013) | EXPIRATION (1014) | DETAIL (1015) |
|---|---|---|---|---|
| Xyz1 | TLS | CA001 | 2020/1/1 | |
| Xyz2 | IPSEC | CA001 | 2036/1/1 | |
| Xyz3 | IEEE802.1.X | CA001 | 2025/1/1 | |

FIG. 10B

CERTIFICATE OBTAINMENT REQUEST/SETTING SCREEN

CERTIFICATE LIST
CONNECTION SETTINGS
CA CERTIFICATE OBTAINMENT
CERTIFICATE ISSUANCE REQUEST

CONNECTION SETTINGS

SERVER NAME : http://xyz1.abc.co.jp/xxxxxxx/yyyyy — 1016

PORT NUMBER : 80 — 1017

SETTING — 1018

FIG. 11A

CERTIFICATE OBTAINMENT REQUEST/SETTING SCREEN

CERTIFICATE LIST

CONNECTION SETTINGS

CA CERTIFICATE OBTAINMENT

CERTIFICATE ISSUANCE REQUEST

CONNECTION SETTINGS

SERVER NAME : http://xyz1.abc.co.jp/xxxxxxx/yyyyy

PORT NUMBER : 80

[ SETTING ]

1101

SETTINGS HAVE BEEN IMPLEMENTED

FIG. 11B

CERTIFICATE OBTAINMENT REQUEST/SETTING SCREEN

CERTIFICATE LIST

CONNECTION SETTINGS

CA CERTIFICATE OBTAINMENT

CERTIFICATE ISSUANCE REQUEST

CA CERTIFICATE OBTAINMENT

CA CERTIFICATE OBTAINMENT    [ EXECUTE ]—1102

FIG. 13A

CERTIFICATE OBTAINMENT REQUEST/SETTING SCREEN

CERTIFICATE LIST

CONNECTION SETTINGS

CA CERTIFICATE OBTAINMENT

CERTIFICATE ISSUANCE REQUEST

CERTIFICATE ISSUANCE REQUEST TRANSMISSION

NAME: Xyz4 — 1301

KEY LENGTH: ○1024bit ●2048bit ○3072bit ○4096bit — 1302

INPUT ISSUANCE DESTINATION INFORMATION — 1303

- COUNTRY: JP
- PREFECTURE:
- CITY:
- ORGANIZATION: ABC
- ORGANIZATION UNIT: EV01
- COMMON NAME: Device001

SIGNATURE VERIFICATION ●ENABLE ○DISABLE — 1304

KEY APPLICATION ☑TLS ☐IPSEC ☐IEEE802.1.X — 1305

PASSWORD: ABCDEFG12345

1307 — EXECUTE — 1306

FIG. 13B

CERTIFICATE OBTAINMENT REQUEST/SETTING SCREEN

CERTIFICATE LIST

CONNECTION SETTINGS

CA CERTIFICATE OBTAINMENT

CERTIFICATE ISSUANCE REQUEST

CERTIFICATE ISSUANCE REQUEST TRANSMISSION — 1308

CERTIFICATE ISSUANCE/OBTAINMENT HAS SUCCEEDED

PLEASE CONFIRM THE ISSUED CERTIFICATE ON THE CERTIFICATE LIST

PLEASE RESTART TO IMPLEMENT THE SETTINGS

RESTART — 1309

FIG. 14A

| CERTIFICATE OBTAINMENT REQUEST/SETTING SCREEN | |
|---|---|
| CERTIFICATE LIST<br><br>CONNECTION SETTINGS<br><br>CA CERTIFICATE OBTAINMENT<br><br>CERTIFICATE ISSUANCE REQUEST | CERTIFICATE ISSUANCE REQUEST TRANSMISSION<br><br>1401<br>CERTIFICATE ISSUANCE/OBTAINMENT HAS FAILED |

FIG. 14B

| CERTIFICATE OBTAINMENT REQUEST/SETTING SCREEN | |
|---|---|
| CERTIFICATE LIST<br><br>CONNECTION SETTINGS<br><br>CA CERTIFICATE OBTAINMENT<br><br>CERTIFICATE ISSUANCE REQUEST | RESTART WILL BE PERFORMED TO IMPLEMENT THE SETTINGS |

FIG. 15

| CERTIFICATE OBTAINMENT REQUEST/SETTING SCREEN | |
|---|---|
| CERTIFICATE LIST<br><br>CONNECTION SETTINGS<br><br>CA CERTIFICATE OBTAINMENT<br><br>CERTIFICATE ISSUANCE REQUEST | CERTIFICATE LIST<br><br>| NAME | APPLICATION | ISSUER | EXPIRATION | DETAIL |<br>|---|---|---|---|---|<br>| Xyz1 | — | CA001 | 2020/1/1 | 🛡 |<br>| Xyz2 | IPSEC | CA001 | 2036/1/1 | 🛡 |<br>| Xyz3 | IEEE802.1.X | CA001 | 2025/1/1 | 🛡 |<br>| Xyz4 | TLS | CA001 | 2021/1/1 | 🛡 |<br><br>1501 |

FIG. 16

| CERTIFICATE OBTAINMENT REQUEST/SETTING SCREEN | |
|---|---|
| CERTIFICATE LIST<br><br>CONNECTION SETTINGS<br><br>CA CERTIFICATE OBTAINMENT<br><br>CERTIFICATE ISSUANCE REQUEST | DETAILS OF CERTIFICATE INFORMATION<br><br>NAME : Xyz1<br><br>APPLICATION : TLS<br><br>ISSUER : CN=CA01, C=JP<br><br>START OF VALIDITY PERIOD : 2017/1/1<br>EXPIRATION OF VALIDITY PERIOD : 2020/1/1<br><br>ISSUANCE DESTINATION :<br>CN=Device001, OU=Dev.A, O=ABC, C=JP<br><br>KEY ALGORITHM : RSA 2048bit<br><br>SERIAL NUMBER : 01 02 03 04 05<br><br>THUMBMARK OF CERTIFICATE (SHA1) :<br>01 02 01 03 01 04 01 05 01 06 01 07 01 08 01 09 01 0A 0B |

F I G. 17A

| NAME | APPLICATION | ISSUER | START OF VALIDITY PERIOD | EXPIRATION OF VALIDITY PERIOD | ISSUANCE DESTINATION | ALGO-RITHM | KEY LENGTH | SERIAL NUMBER | THUMBMARK |
|---|---|---|---|---|---|---|---|---|---|
| Xyz1 | TLS | CN=CA01, C=JP | 2019/1/1 | 2020/1/1 | CN=Device001, OU=Dev.A, O=ABC, C=JP | RSA | 1024 | 01 02 03 04 05 | 01 02 01 03 01 04 01 05 01 06 01 07 01 08 01 09 0A 01 0B |
| Xyz2 | IPSEC | CN=CA01, C=JP | 2015/1/1 | 2036/1/1 | CN=Device001, OU=Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE802.1X | CN=CA01, C=JP | 2020/1/1 | 2025/1/1 | CN=Device001, OU=Dev.A, O=ABC, C=JP | RSA | 2048 | 01 02 03 04 07 | 03 02 03 03 03 04 03 05 03 06 03 07 03 08 03 09 03 0A 03 0B |

FIG. 17B

| NAME | APPLICATION | ISSUER | START OF VALIDITY PERIOD | EXPIRATION OF VALIDITY PERIOD | ISSUANCE DESTINATION | ALGO-RITHM | KEY LENGTH | SERIAL NUMBER | THUMBMARK |
|---|---|---|---|---|---|---|---|---|---|
| Xyz1 | TLS | CN=CA01, C=JP | 2019/1/1 | 2020/1/1 | CN=Device001, OU=Dev.A, O=ABC, C=JP | RSA | 1024 | 01 02 03 04 05 | 01 02 01 03 01 04 01 05 01 06 01 07 01 08 01 09 0A 01 0B |
| Xyz2 | IPSEC | CN=CA01, C=JP | 2015/1/1 | 2036/1/1 | CN=Device001, OU=Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE802.1X | CN=CA01, C=JP | 2020/1/1 | 2025/1/1 | CN=Device001, OU=Dev.A, O=ABC, C=JP | RSA | 2048 | 01 02 03 04 07 | 03 02 03 03 03 04 03 05 03 06 03 07 03 08 03 09 03 0A 03 0B |
| Xyz4 | NONE | CN=CA01, C=JP | 2020/1/1 | 2025/1/1 | CN=Device001, OU=Dev.A, O=ABC, C=JP | RSA | 2048 | 01 02 03 04 08 | 04 02 04 03 04 04 04 05 04 06 04 07 04 08 04 09 04 0A 04 0B |

F I G. 17C

| NAME | APPLICATION | ISSUER | START OF VALIDITY PERIOD | EXPIRATION OF VALIDITY PERIOD | ISSUANCE DESTINATION | ALGO-RITHM | KEY LENGTH | SERIAL NUMBER | THUMBMARK |
|---|---|---|---|---|---|---|---|---|---|
| Xyz1 | NONE | CN=CA01, C=JP | 2019/1/1 | 2020/1/1 | CN=Device001, OU=DevA, O=ABC, C=JP | RSA | 1024 | 01 02 03 04 05 | 01 02 01 03 01 04 01 05 01 06 01 07 01 08 01 09 0A 01 0B |
| Xyz2 | IPSEC | CN=CA01, C=JP | 2015/1/1 | 2036/1/1 | CN=Device001, OU=DevA, O=ABC, C=JP | RSA | 2048 | 01 02 03 04 06 | 02 02 02 03 02 04 02 05 02 06 02 07 02 08 02 09 02 0A 02 0B |
| Xyz3 | IEEE802.1X | CN=CA01, C=JP | 2020/1/1 | 2025/1/1 | CN=Device001, OU=DevA, O=ABC, C=JP | RSA | 2048 | 01 02 03 04 07 | 03 02 03 03 03 04 03 05 03 06 03 07 03 08 03 09 03 0A 03 0B |
| Xyz4 | TLS | CN=CA01, C=JP | 2020/1/1 | 2025/1/1 | CN=Device001, OU=DevA, O=ABC, C=JP | RSA | 2048 | 01 02 03 04 08 | 04 02 04 03 04 04 04 04 05 04 06 04 07 04 08 04 09 04 0A 04 0B |

FIG. 18

CERTIFICATE OBTAINMENT REQUEST/SETTING SCREEN

ELECTRONIC CERTIFICATE UPDATE RESERVATION SETTING

CERTIFICATE LIST

CONNECTION SETTINGS

CA CERTIFICATE OBTAINMENT

CERTIFICATE ISSUANCE REQUEST

RESERVATION SETTING

○ DESIGNATE AN UPDATE DATE ~1801
  OBTAINMENT REQUEST START DATE [ ] YEAR [ ] MONTH [ ] DAY
  OBTAINMENT REQUEST START TIME [ ] HOUR [ ] MINUTE

⊙ UPDATE THE ELECTRONIC CERTIFICATE IN A CASE WHERE A NUMBER OF DAYS BEFORE THE EXPIRY OF THE VALIDITY PERIOD OF THE CURRENTLY USED ELECTRONIC CERTIFICATE IS A PREDETERMINED NUMBER OR LESS ~1802
  [14] DAYS BEFORE THE EXPIRATION OF THE VALIDITY PERIOD

○ UPDATE BASED ON A PREDETERMINED CYCLE ~1803
  ○ UPDATE AT [ ] DAY INTERVAL
  ○ UPDATE ON [ ] DAY OF EVERY MONTH
  ○ UPDATE ON [ ] MONTH [ ] DAY OF EVERY YEAR

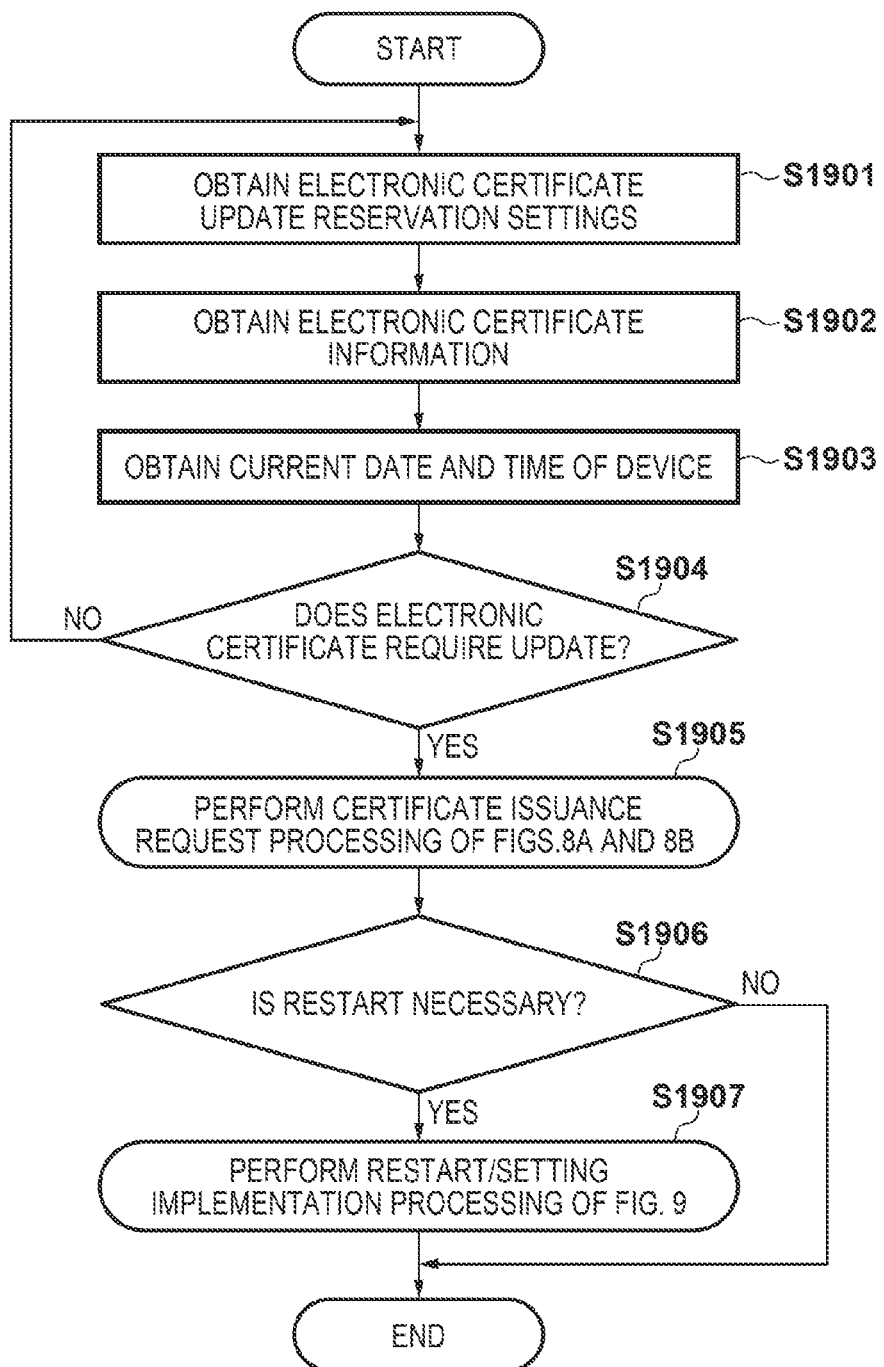

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

When communicating with an external server, a personal computer (PC) that connects to a network such as that of an office and a mobile terminal that is owned by an individual uses a public key certificate (e.g. a digital certificate) to perform a secure communication and authentication.

In recent years, a multi-function peripheral not only simply prints and transmits images, but also has a function of providing a file storage service to a PC by storing image data in the multi-function peripheral. Hence, a multi-function peripheral has come to perform the role of an information processing apparatus similar to that of other server devices that are present on a network. In order to maintain a safe and secure office environment while these information processing apparatuses are used on a network, communication based on an authentication using an electronic certificate (i.e. a digital certificate) is required. In general, a safer network identification and authentication have been implemented by using the technique based on a public key infrastructure (PKI), which uses such an electronic certificate (see RFC3647: Internet X.509 Public Key Infrastructure Certificate Polity and Certificate Practices Framework).

For example, if an information processing apparatus is to be a client, the authenticity of a server can be verified by obtaining a server public key certificate from the server and a Certificate Authority (CA) certificate that was used in issuing the server public key certificate. Also, it is possible for the server to verify the authenticity of the client by providing a client public key certificate of client (e.g. the information processing apparatus) to the server. Additionally, if the information processing apparatus is to act as the server, a server public key certificate of the information processing apparatus can be distributed to a client to be connected so that the client can verify the authenticity of the information processing apparatus as the server. In this manner, an electronic certificate has been used as an important tool for information processing apparatuses to perform an authentication/verification and an identification in a network communication/environment. For example, SSL, TLS, IEEE802.1X, and IPSEC are some of the communication protocols that are used in such an electronic certificate based secure communication.

Conventionally, since an electronic certificate needs to be stored/held in an information processing apparatus, an electronic certificate that has been issued by a certificate authority is manually stored in a storage of the information processing apparatus with a user of the information processing apparatus manually performing the storing. This storage method is performed by downloading the electronic certificate from the certificate authority that issues the electronic certificate, copying the electronic certificate from an external storage such as a USB memory, or copying the electronic certificate received via email into a predetermined folder in the storage.

Depending on the actual implementation of the communication, a separate electronic certificate may be used for each information processing apparatus. For example, in general, when IEEE802.1X or the like is applied for the communication, an electronic certificate is individually stored for each information processing apparatus for performing a client authentication. Also, an electronic certificate has a validity period (i.e. a period of time or a date/time after which the electronic certificate is no longer valid/not useable for authentication/verification), and a communication using the electronic certificate is disabled when the validity period expires. Hence, an electronic certificate stored in a device (such as the information processing apparatus) needs to be updated when the validity period expires or (preferably immediately) before the expiration. Furthermore, when an electronic certificate is to be used, it is necessary to manually set each electronic certificate that is going to be used in correspondence with each communication application, such as TLS or IEEE802.1X, which is going to be used by each information processing apparatus.

However, in a case in which there are many information processing apparatuses that handle/need electronic certificates, if a user has to manually add, update, and set each electronic certificate for each of these information processing apparatuses, this can place a heavy workload/burden on the user and can take too much time.

SUMMARY OF THE INVENTION

An aspect of the present invention is to eliminate, or at least reduce disadvantageous effect arising from, the above-mentioned problem with the conventional technology.

A feature of the present invention is to provide a technique/mechanism to easily add and update an electronic certificate in an information processing apparatus.

According to a first aspect of the present invention, there are provided an information processing apparatus comprising: a memory device that stores a set of instructions; and at least one processor that executes the set of instructions to: generate a public key pair; generate a certificate signing request based on the generated public key pair; transmit an electronic certificate issuance request that includes the generated certificate signing request to an external apparatus; receive a response transmitted from the external apparatus as a response to the electronic certificate issuance request; obtain an electronic certificate included in the received response; and cause an application to enable its use of the obtained electronic certificate.

According to a second aspects of the present invention, there are provided a method of controlling an information processing apparatus configured to perform communication using an electronic certificate, the method comprising: generating a public key pair and generating a certificate signing request based on the generated public key pair; transmitting an electronic certificate issuance request that includes the generated certificate signing request to an external apparatus; receiving a response transmitted from the external apparatus as a response to the electronic certificate issuance request; obtaining an electronic certificate included in the response received in the receiving; and causing an application to enable its use of the electronic certificate obtained in the obtaining.

Further features, aspects, and advantages of the present invention will become apparent from the following description of embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

The accompanying drawings, which are incorporated in and constitute a part of the specification, illustrate embodiments of the invention and, together with the description, serve to explain the principles of the invention.

BRIEF DESCRIPTION OF THE DRAWINGS

FIGS. 4A and 4B are sequence charts illustrating an overall process sequence to be run on a network arrangement or a system according to the first embodiment;

FIG. 6 is a flowchart illustrating a connection setup process for establishing a connection with a certificate/registration authority in step S407 of FIG. 4A performed by the multi-function peripheral according to the first embodiment;

FIG. 7 is a flowchart illustrating a Certificate Authority (CA) certificate obtainment/registration process in step S412 to step S416 of FIG. 4A performed by the multi-function peripheral according to the first embodiment;

FIGS. 8A and 8B are flowcharts illustrating a certificate issuance request/obtainment process in step S419 to step S424 of FIG. 4B performed by the multi-function peripheral according to the first embodiment;

FIG. 9 is a flowchart illustrating processing related to a restart of the multi-function peripheral in step S424 to step S427 of FIG. 4B performed by the multi-function peripheral according to the first embodiment;

FIGS. 10A-10B, 11A-11B, 12A-12B, 13A-13B, 14A-14B, and 15 depict screen views showing examples of a web page screen of a Remote User Interface (RUI) which is to be displayed on a PC according to the first embodiment;

FIG. 16 depicts a screen view showing an example of detailed information of the electronic certificate which is to be displayed on the PC according to the first embodiment;

FIGS. 17A to 17C depict conceptual views of a key pair/electronic certificate detailed information database managed by a key pair certificate management module of the multi-function peripheral according to the first embodiment;

FIG. 18 depicts a view illustrating an example of an electronic certificate update reservation setting screen provided by a multi-function peripheral according to a second embodiment; and FIG. 19 is a flowchart illustrating processing performed when an electronic certificate automatic update function is executed/performed based on the electronic certificate update reservation setting set on the multi-function peripheral according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that as an example of an information processing apparatus that uses and manages an electronic certificate according the embodiments, a multi-function peripheral (a digital multi-function peripheral/MFP) will be described. However, the present invention is not limited to the multi-function peripheral, and the present invention is applicable to any device or a component thereof as long as it is an information processing apparatus in which an electronic certificate can be used or managed.

First Embodiment

Figure 1:
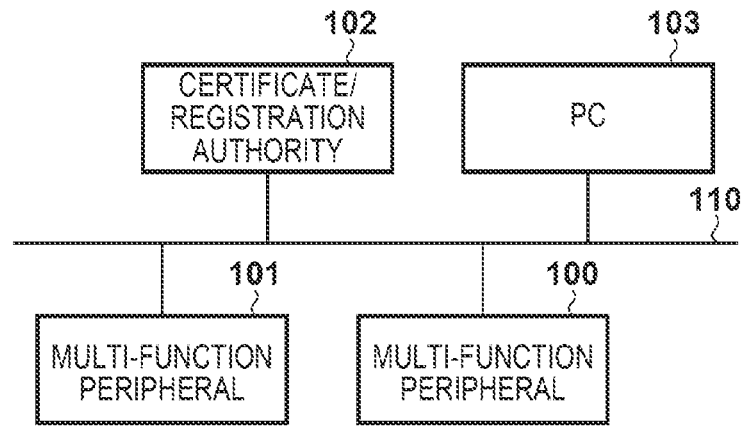
FIG. 1 is a block diagram illustrating a network arrangement or a system according to a first embodiment of the present invention.

FIG. 1 is a block diagram for explaining a network arrangement (or a system) according to the first embodiment of the present invention.

A multi-function peripheral 100 having a print function can exchange print data, scanned image data, device management information, and the like with another information processing apparatus via a network 110. The multi-function peripheral 100 is capable of performing an encrypted communication using communication/cryptographic protocols such as Transport Layer Security (TLS), Internet Protocol Security (IPSEC), and IEEE802.1X and holds (e.g. stores or manages) a public key pair and an electronic certificate (i.e. a digital certificate) that are used for performing these encryption processes. Here, the multi-function peripheral 100 may be an example of an image forming apparatus. It is understood that such an image forming apparatus is not limited to the multi-function peripheral and may be an apparatus that functions solely as a facsimile apparatus, a printer, or a copy machine or may be an apparatus that functions as any combination of these single function apparatuses. Another multi-function peripheral 101 is also connected to the network 110, and this second multi-function peripheral 101 may have the same functions as those of the multi-function peripheral 100, or share at least some of its functions. Although only the multi-function peripheral 100 will be mainly described hereinafter, it is understood that the exchange/communication of electronic certificates may be performed among/for a plurality of multi-function peripherals.

A certificate/registration authority 102 has a certificate authority (CA) function of issuing an electronic certificate and a registration authority (RA) function of accepting (in some cases, including verification/authentication) an electronic certificate issuance request and performing a registration process based on the accepted request. That is, this certificate/registration authority 102 is, for example, a server apparatus (which is an example of an information processing apparatus) that performs a function of distributing a CA certificate (e.g. for authenticating a CA electronic signature on a server certificate) and issuing/registering an electronic certificate (e.g. for establishing a secure communication) via the network 110. In the first embodiment, assume that SCEP (Simple Certificate Enrollment Protocol) is used as the communication protocol of the network 110. However, it is understood that various other types of protocols for issuing/managing an electronic certificate may also be used with the network arrangement of the first embodiment as long as they are able to provide corresponding functions. An information processing apparatus such as the multi-function peripheral 100 uses this SCEP to communicate with the certificate/registration authority 102 via the network 110 to transmit an electronic certificate issuance request and to obtain the issued electronic certificate. The multi-function peripheral 100 according to the first embodiment has a Web server function and can publish, on the network 110, a Web-page-format remote user interface (RUI) function that can be used to execute/perform processing for the electronic certificate issuance request and obtainment (acquisition).

When an electronic certificate issuance request is received from an information processing apparatus via the network 110, the certificate/registration authority 102 performs an electronic certificate issuance and registration processing based on the received issuance request and transmits the issued electronic certificate as a response to the issuance request. Note that although the function of a CA and the function of an RA are implemented by the same server apparatus in this first embodiment, the present invention is not limited to this. It is also possible to adopt an arrangement in which the CA and the RA are implemented as separate server apparatuses, for example a CA server and a separate RA server. Additionally, although the first embodiment uses SCEP as the protocol for making an electronic certificate issuance request and for obtaining the issued electronic certificate, the present invention is not limited to this as long as a protocol that has the same or compatible functions is adopted. For example, it is possible to use a protocol such as CMP (Certificate Management Protocol) or EST (Enrollment over Secure Transport).

A PC 103 is a personal computer. The PC 103 has a Web browser function. This makes it possible (i.e. enables a user or an information processing apparatus) to browse and use HTML documents and Websites which have been made public by an information processing apparatus that is connected to the network 110. It is understood that although the PC 103 is shown/described herein, any device/terminal capable of providing a web browser function, or displaying information and receive a user input (e.g. a tablet, a mobile phone, a wearable technology based device, inter alias), may be used instead as long as it is communicable with the information processing apparatus on the network 110.

The outline of the electronic certificate obtainment and an update process according to the first embodiment will be described next.

An administrator of the multi-function peripheral 100 uses a Web browser installed on the PC 103 to connect to a Web page for an electronic certificate issuance request and obtainment, which is made accessible (e.g. by making it public) by the multi-function peripheral 100. The administrator uses the webpage to set settings and instructions for executing the processes for the electronic certificate issuance request and obtainment (i.e. the electronic certificate issuance request and obtainment/acquisition processes). The multi-function peripheral 100 makes (i.e. generates), in accordance with the settings and the instructions (e.g. information/contents as instructed via the webpage) set by the administrator, an obtainment request (an acquisition request) for a CA certificate and an electronic certificate issuance request to the certificate/registration authority 102 by SCEP. The multi-function peripheral 100 also obtains the electronic certificate, which is issued by the certificate/registration authority 102 as it is included in the response to the electronic certificate issuance request. The multi-function peripheral 100 then performs a setting operation (i.e. a setup or initialization operation) to use the obtained electronic certificate in the multi-function peripheral 100.

The hardware arrangement of the multi-function peripheral 100 according to the first embodiment will be described next.

Figure 2:
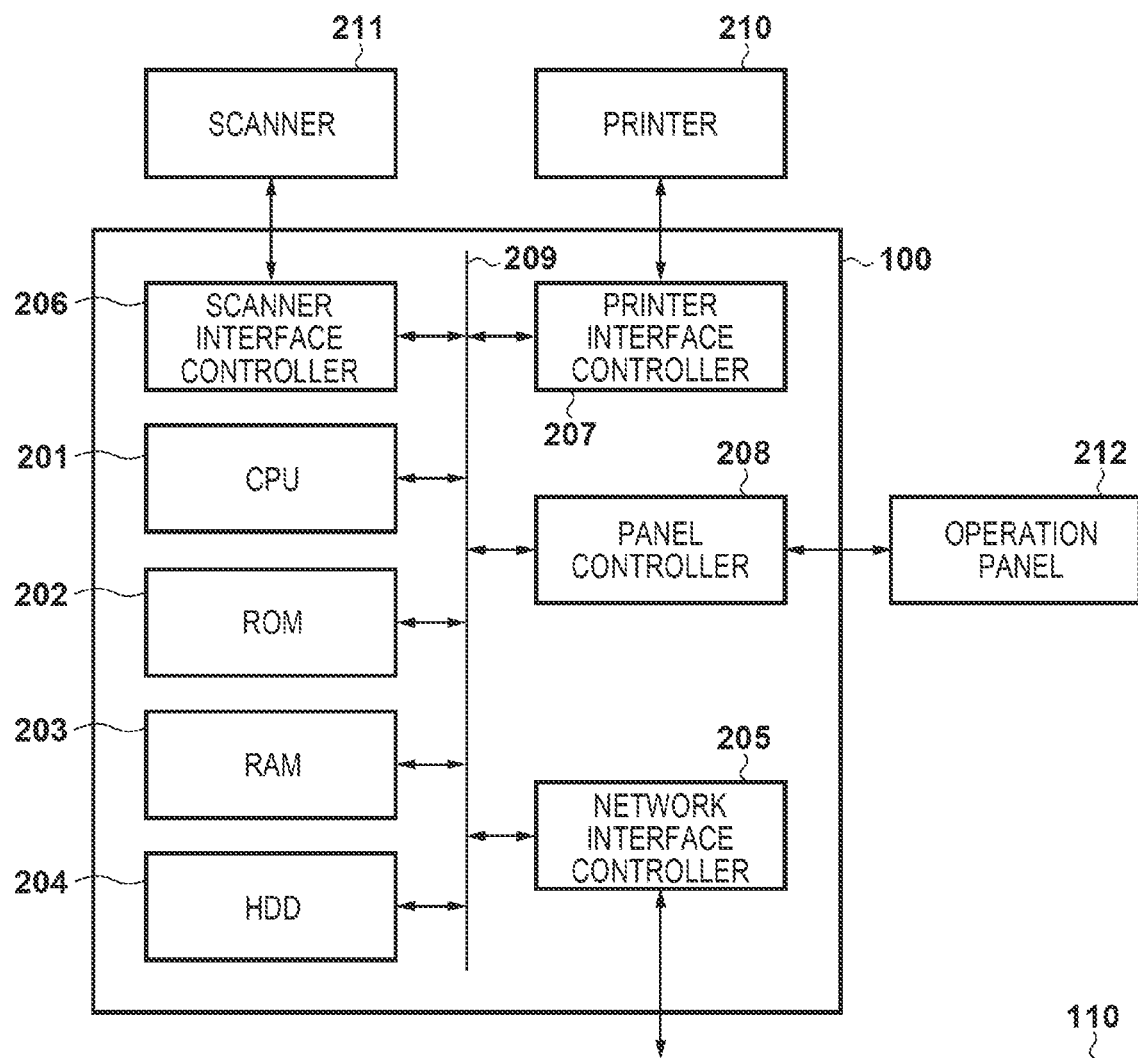
FIG. 2 is a block diagram illustrating a hardware arrangement of a multi-function peripheral according to the first embodiment.

FIG. 2 is a block diagram for explaining the hardware arrangement of the multi-function peripheral 100 according to the first embodiment.

A CPU 201 executes a software program of the multi-function peripheral 100 to control/operate the overall apparatus. A ROM 202 is a read-only memory and stores boot programs, fixed parameters, and the like for the operation of the multi-function peripheral 100. A RAM 203 is a random access memory and is used to store programs and temporary data when the CPU 201 is to control/operate the multi-function peripheral 100. An HDD 204 is a hard disk drive and stores system software, applications, and various other kinds of data. The CPU 201 controls the operation of the multi-function peripheral 100 by executing a boot program stored in the ROM 202, deploying a program stored in the HDD 204 to the RAM 203, and executing the deployed program. A network interface controller 205 controls the data exchange between the network 110 and the multi-function peripheral 100. An input interface controller (e.g. a scanner interface controller 206) controls an image data acquisition (e.g. a scanning or reading of a document) performed by an input device such as a scanner 211. An output interface controller (e.g. a printer interface controller 207) controls a data output (e.g. a printing process) performed by an output such as the printer 210. A display controller (e.g. a panel controller 208) controls a display device and an input device (e.g. a touch-panel-type operation panel 212) to control displaying of various kinds of information and receiving/processing of instructions input by a user. The CPU 201, the ROM 202, the RAM 203, the HDD 204, the network interface controller 205, the scanner interface controller 206, the printer interface controller 207, and the panel controller 208 are communicable with each other, for example they are connected to each other by a bus 209. Control signals from the CPU 201 and data signals between different components of the apparatus are exchanged/communicated via the bus 209.

Figure 3:
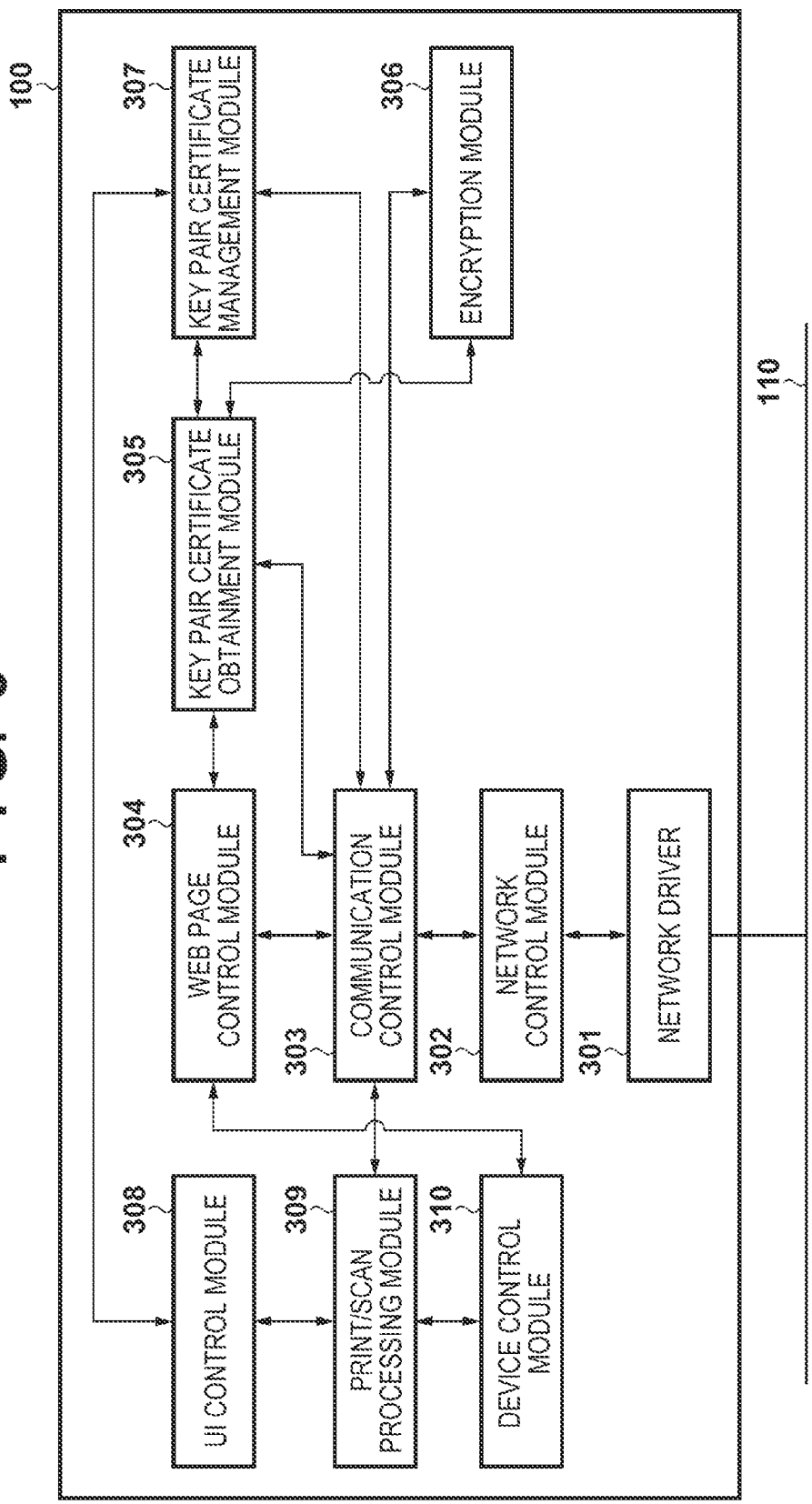
FIG. 3 is a block diagram illustrating software modules to be included in a program running on the multi-function peripheral according to the first embodiment.

FIG. 3 is a block diagram for explaining software modules included in (e.g. functional components of) programs to be executed or run on the multi-function peripheral 100 according to the first embodiment. Note that the software modules shown in FIG. 3 are implemented by the CPU 201 deploying a program in the RAM 203 and executing the deployed program, for example.

A network driver 301 controls the network interface controller 205 connected to the network 110 and exchanges data (i.e. communicates) with the outside via the network 110. A network control module 302 performs data exchange by controlling communication in the transport layer and the lower layers in a network communication protocol such as TCP/IP. A communication control module 303 is a module for controlling (and implementing) a plurality of communication protocols supported by the multi-function peripheral 100. In the electronic certificate obtainment and update processes according to the first embodiment, the communication control module 303 makes (e.g. generates and transmits) an HTTP protocol communication request, generates response data, performs an analysis, controls the exchange of data, and executes processes for a communication with the certificate/registration authority 102 and/or the PC 103. The communication control module 303 is also capable of performing (e.g. by executing appropriate processes/programs) an encrypted communication using TLS, IPSEC, and IEEE802.1X, if supported by the multi-function peripheral 100.

A web page control module 304 is a module that performs HTML data generation and communication control to display a Web page capable of instructing/executing (e.g. by executing an appropriate program) the electronic certificate issuance request and obtainment processes. The web page control module 304 executes/performs processing for a Web page display request, an electronic certificate issuance request, and an instruction for executing/enabling the obtainment of the issued electronic certificate by transmitting/receiving them with the communication control module 303 via the network driver 301. The web page control module 304 transmits, as a response to a request made from (using an input made on) the Web browser, the HTML data of a predetermined Web page stored in the RAM 203 and the HDD 204 or the HTML data generated in accordance with the content of a display request (e.g. a request for displaying detailed information of an electronic certificate).

A key pair certificate obtainment module 305 is a module for executing the electronic certificate obtainment process based on an instruction from the web page control module 304. The key pair certificate obtainment module 305 is a module that performs a communication control by SCEP, an encrypted data generation and an analysis processing necessary for a communication using SCEP such as PKCS#7 and PKCS#10, and storage and application setting (e.g. setup or initialization) processing of the obtained electronic certificate. An encryption module 306 is a module that executes various kinds of encryption processes such as data encryption and decryption processes, generation and verification of an electronic signature, and hash value generation. In the electronic certificate obtainment and update processing according to the first embodiment, the encryption module 306 executes encryption processes necessary for the generation and analysis of SCEP request/response data. A key pair certificate management module 307 is a module that manages public key pairs and electronic certificates held/stored in the multi-function peripheral 100. For example, the key pair certificate management module 307 stores the public key pair and the data of each electronic certificate in the RAM 203 and/or the HDD 204 together with various kinds of setting values. Although processes for detailed information display, generation, and deletion of the public key pair and the electronic certificate are not shown in FIG. 3, it is possible to execute the processes based on user instructions (e.g. received via the operation panel 212). A UI control module 308 executes/performs a control of the operation panel 212 and the panel controller 208. Note that according to this embodiment even in the case of an encrypted communication processes such as TLS, IPSEC, IEEE802.1X being executed by the communication control module 303, the encryption processing itself is performed in the encryption module 306, and the public key pair and electronic certificate data which are to be used will be obtained from the key pair certificate management module 307. However, it is understood that other arrangements for the encryption processes, and the publish key pair and electronic certificate data are also possible as long as functionally equivalent or compatible features are provided by these arrangements.

An output/input processing module (e.g. a print/scan processing module 309) is a module for controlling the execution of output/input functions such as a data output function (e.g. printing by the printer 210) and a data input function (e.g. document reading/scanning by the scanner 211). A device control module 310 is a module for controlling (e.g. centrally) the multi-function peripheral 100 by generating control commands and control data for the operation of the multi-function peripheral 100. Note that the encryption module 306 according to the first embodiment has access to the power supply to the multi-function peripheral 100 so that, if needed, it can execute a restart processing of the multi-function peripheral 100 based on an instruction from the web page control module 304.

Figure 4B:
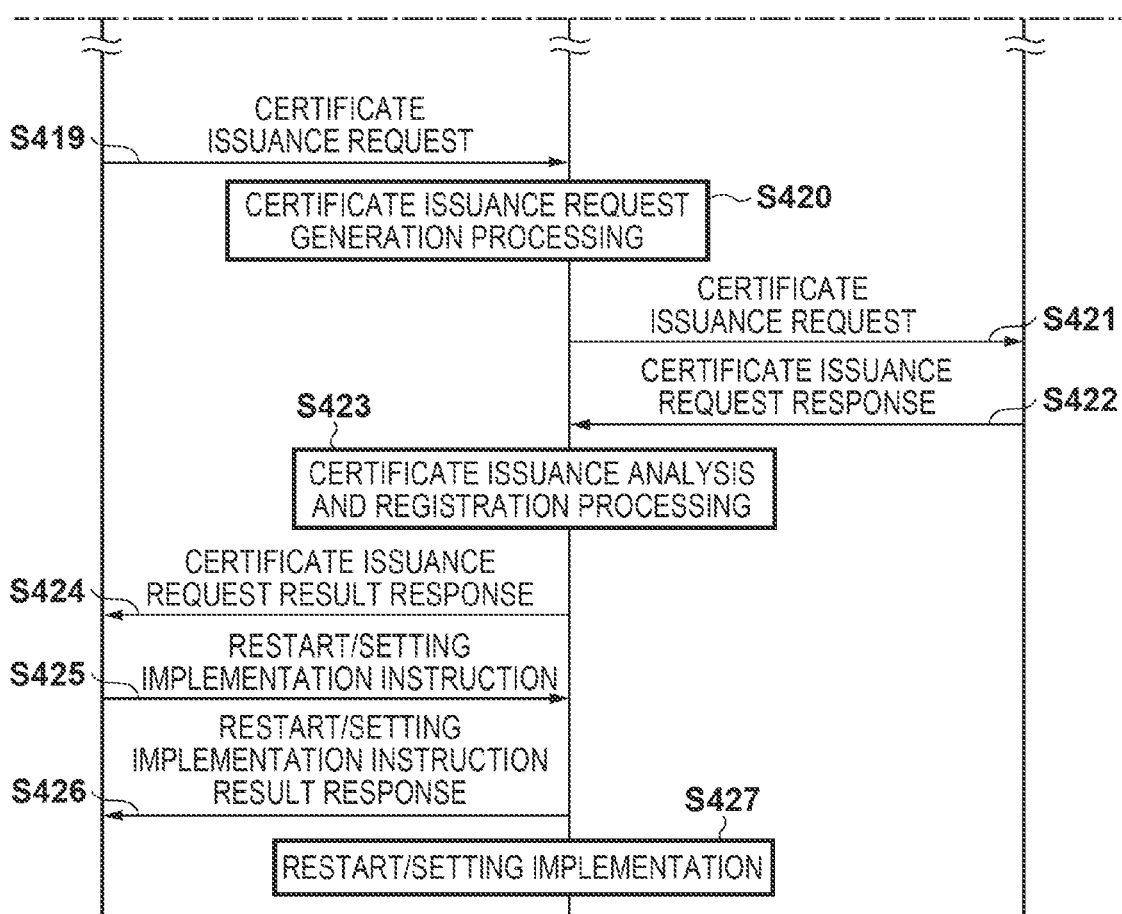

FIGS. 4A and 4B are sequence charts for explaining a sequence process steps involved in an overall processing performed in a network arrangement or a system according to the first embodiment. The sequence starts from an initial setup/initialization of settings related to an issuance request for an electronic certificate, displaying information on the electronic certificate, the issuance request and reception of the electronic certificate, and then moves on to an enabling use of the electronic certificate a restart of the multi-function peripheral.

This sequence is started in response to a key pair and electronic certificate list display instruction input by a user. Although an example of the processes that are performed for one multi-function peripheral 100 is described in this embodiment, the same processes may be performed by a plurality of multi-function peripherals 100 and 101 in response to one start instruction. For example, a request may be transmitted from the PC 103 to each of the multi-function peripherals 100 and 101, and the processes shown in the following flowcharts of FIG. 5A to FIG. 9 may be executed in each multi-function peripheral. In such a case, the steps in which a certificate is obtained, displayed, and confirmed in each of the multi-function peripherals 100 and 101 may be skipped. Also, a certificate with an expired validity period may be automatically detected by each multi-function peripheral, the bibliographic information (a certificate ID and the validity period) of the expired certificate may be transmitted to the PC 103, and the PC 103 may cause the plurality of multi-function peripherals to automatically execute the update process of the certificate which has a validity period that is about to expire or has already expired. This aforementioned operation is a so-called silent installation.

First, in step S401, upon accepting a connection from (i.e. establishing a communication channel with) the PC 103, the multi-function peripheral 100 receives, from the PC 103, a request to display the key pair/electronic certificate list held by the multi-function peripheral 100. In the first embodiment, assume that the administrator of the multi-function peripheral 100 will use a Web browser installed on the PC 103 to connect to a Web-page-format RUI, which is used to make an issuance request and to obtain an electronic certificate published by the multi-function peripheral 100, and perform instruction related operations (e.g. input an instruction for an operation to be performed on the multi-function peripheral 100 or 101). This RUI is an acronym of Remote User Interface and is a technique that allows a user to use the Web browser of the PC 103 to remotely make a request for operation screen data of the multi-function peripheral 100 or 101 to display the operation screen on the PC 103. As an example, it is possible to implement the screen using HTML and servlet.

Next, in step S402, the multi-function peripheral 100 obtains data for displaying the key pair/electronic certificate list held in the multi-function peripheral 100 and executes a Web page screen generation processing to display the obtained data.

Figure 5A:
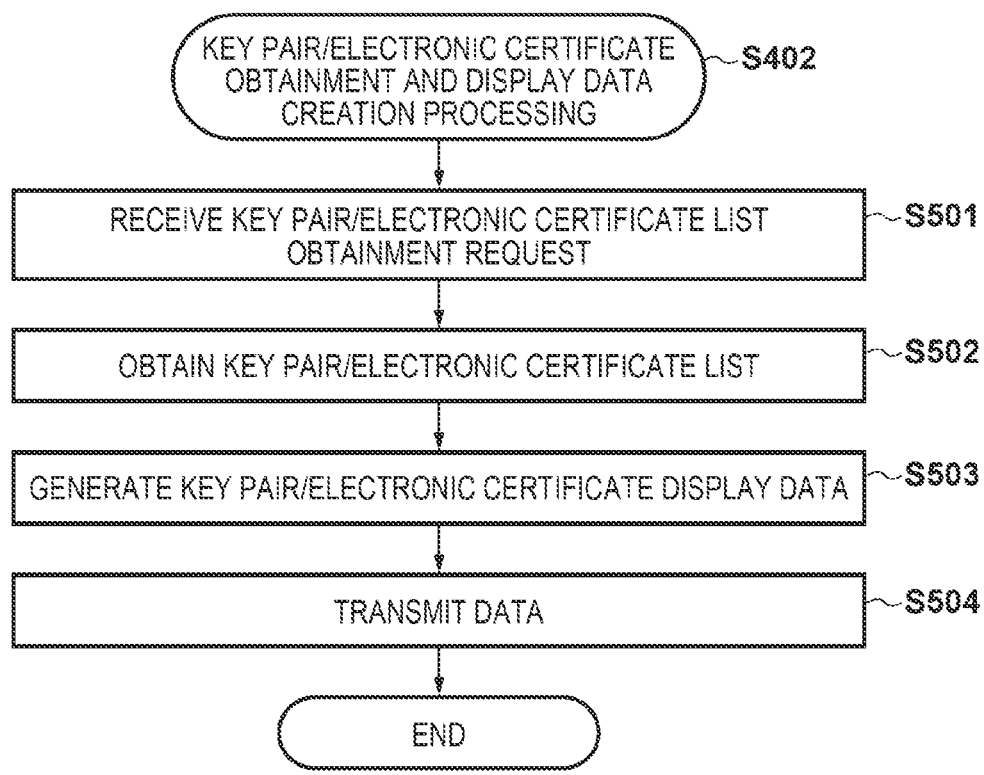
FIG. 5A is a flowchart illustrating a key pair/electronic certificate list obtainment and display data creation processing in step S402 of FIG. 4A by the multi-function peripheral according to the first embodiment.

FIG. 5A is a flowchart for describing processes involved in a key pair/electronic certificate list obtainment and display data creation/generation in step S402 of FIG. 4A. Note that this processing is implemented by the CPU 201 executing a program deployed in the RAM 203, for example.

FIGS. 17A to 17C depict conceptual views of the key pair/electronic certificate detailed information database managed by a key pair certificate management module 307. According to this embodiment, this database is stored in the HDD 204 of the multi-function peripheral 100. However, it is understood that this database may be stored elsewhere as long as it is accessible by the multi-function peripheral 100 when needed.

The flowchart of FIG. 5A will now be described. This processing is started (instigated) when a key pair/electronic certificate list obtainment request is received. First, in step S501, the CPU 201 receives the key pair/electronic certificate list obtainment request. Next, the process advances to step S502, and the CPU 201 obtains, for example, the detailed information of the key pair/electronic certificate shown in FIG. 17A which is managed by the key pair certificate management module 307. Next, the process advances to step S503, and the CPU 201 uses the detailed information of the key pair/electronic certificate obtained in step S502 to generate HTML data for a Web page screen which is to be provided as an RUI.

FIGS. 10A to 15 depict views showing examples of the Web page screens (i.e. RUIs) that are to be displayed on the PC 103 according to the first embodiment. In step S503 of FIG. 5 according to the first embodiment, assume that the HTML data for the Web page screen shown in FIG. 10A will be generated and that the generated HTML data will be displayed using the Web browser of the PC 103. As a result, the key pair/electronic certificate list held by the multi-function peripheral 100 can easily be confirmed from the PC 103.

The information of the electronic certificate that is displayed in the list of FIG. 10A includes a name 1011, an application 1012, an issuer 1013, expiration 1014, and detail 1015 of the certificate. The name 1011 is a character string arbitrarily added by an operator such as the administrator of the multi-function peripheral 100 when the key pair/electronic certificate is issued. The application 1012 is a setting value indicating that the key pair/electronic certificate will be used for an application implementing/using a particular communication protocol of TLS, IPSEC, or IEEE802.1X. The issuer 1013 is a distinguished name (DN) (i.e. an identification) of the CA that issued the electronic certificate. The expiration 1014 is information indicating the date on which the validity period of the electronic certificate will expire. The detail 1015 is an icon for displaying the detailed information of the electronic certificate. The process subsequently advances to step S504, and the CPU 201 transmits, as a response to step S501, the HTML data generated in step S503 to the PC 103 and ends the processing. Thus, step S403 of FIG. 4A is executed in this manner.

Note that although not shown in the sequence charts of FIGS. 4A and 4B, a request to display the detailed information of the electronic certificate is transmitted from the PC 103 to the multi-function peripheral 100 when the administrator of the multi-function peripheral 100 clicks the icon of the detail 1015 in FIG. 10A when it is displayed on the PC 103. The multi-function peripheral 100 that received this display request will obtain the detailed information of the electronic certificate, generate the HTML data for the detailed information of the certificate based on the obtained information, and transmit the generated data to the PC 103 as a response to the display request.

As a result, the detailed information of the electronic certificate is displayed on the Web browser of the PC 103, for example, in the manner shown in FIG. 16. FIG. 16 depicts an example view of the detailed information of the electronic certificate that is displayed on the PC 103.

Figure 5B:
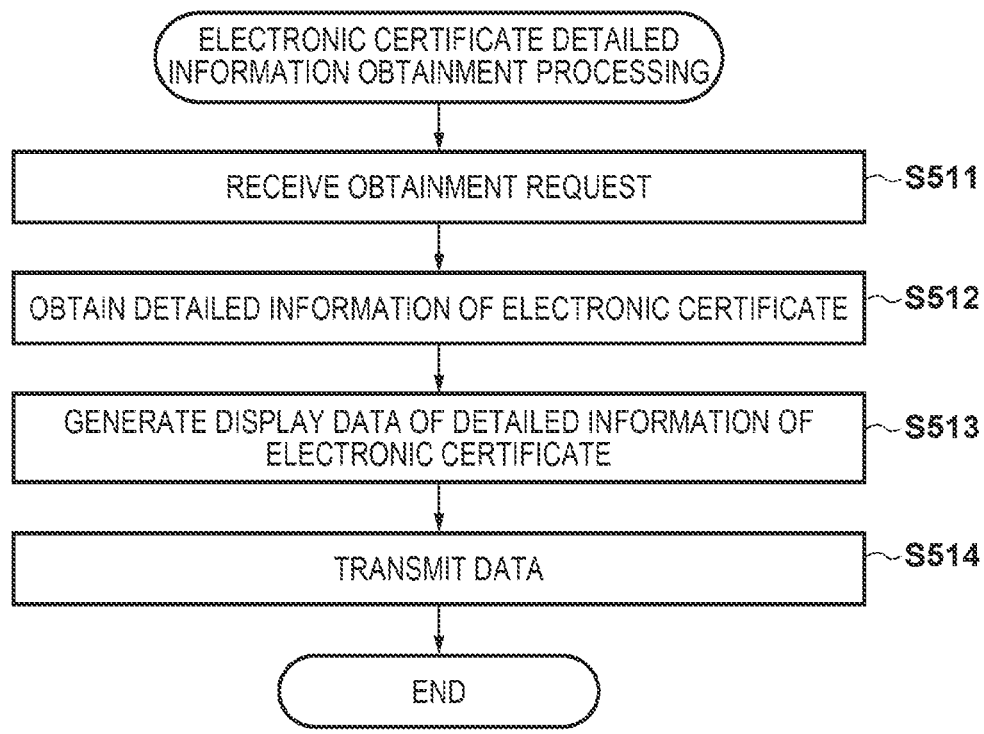
FIG. 5B is a flowchart illustrating processing performed when a detailed information display request transmitted from a PC is received by the multi-function peripheral according to the first embodiment.

FIG. 5B is a flowchart for describing the processing performed when a request to display this detailed information is received from the PC 103 by the multi-function peripheral 100 according to the first embodiment. Note that this processing is implemented by the CPU 201 executing a program deployed in the RAM 203, for example.

First, in step S511, the CPU 201 receives a request to obtain the detailed information of the electronic certificate from the PC 103. Next, the process advances to step S512, and the CPU 201 obtains the detailed information of the key pair/electronic certificate shown in FIG. 17A which is managed by the key pair certificate management module 307. Next, the process advances to step S513, and the CPU 201 generates the HTML data for a Web page screen by using the detailed information of the key pair/electronic certificate obtained in step S512 and transmits the generated HTML data to the PC 103 in step S514.

FIG. 16 depicts a screen view showing an example of the display screen view of the detailed information of the electronic certificate according to the first embodiment. This screen view is displayed as an RUI in a Web-page format on the PC 103.

Returning to the description of FIG. 4A again, in step S403, the multi-function peripheral 100 transmits, as a response to a request from the PC 103, the HTML data for the Web-page screen shown in FIG. 10A which is generated in step S402.

Note that the processes shown in the above-described step S401 to step S403 of FIG. 4A, step S501 to step S504 of FIG. 5A, and step S511 to step S514 of FIG. 5B show control process steps related to the electronic certificate information display processing performed by the multi-function peripheral 100 when a request to display the key pair/electronic certificate list is received.

In step S404, the multi-function peripheral 100 receives a request to display a connection setup screen of a SCEP server (an example of a CA/RA 102) from the PC 103. Assume that in order to perform a connection setup operation (e.g. a setting of connection settings/parameters for establishing a communication channel/connection) with the certificate/registration authority 102, the administrator of the multi-function peripheral 100 according to the first embodiment clicks on connection settings 1002 shown in FIG. 10A to transmit a connection setup screen display request to the multi-function peripheral 100.

Next, in step S405, the multi-function peripheral 100 transmits, as a response to the request received in step S404, HTML data for a predetermined SCEP server connection setup screen shown in FIG. 10B to the PC 103.

The connection setup screen shown in FIG. 10B includes input fields for a server name/address 1016 and a port number 1017 for inputting the SCEP server host name (e.g. its IP address) and the connection destination port number, respectively, and a setting button 1018 for instructing/indicating the completion of the setup/setting process, i.e.

the completion of setting of the input setting values so that these can be effected for the connection.

Next, in step S406, the multi-function peripheral 100 receives a setting instruction request of the connection setup operation from the PC 103. Assume that the administrator of the multi-function peripheral 100 according to the first embodiment will transmit this setting instruction request to the multi-function peripheral 100 by clicking on the setting button 1018 after inputting the necessary information relating to the server name 1016 and the port number 1017 of FIG. 10B from the PC 103.

Next, in step S407, the multi-function peripheral 100 performs the connection setup operation (i.e. sets the connection settings in accordance with the input information), and executes the generation of a Web page screen data for displaying the setting process and the setting result of the connection setup operation. In step S408, the multi-function peripheral 100 transmits, as a response to the request from the PC 103, the HTML data for the Web page screen based on the web page screen data generated in step S407 and shown in FIG. 11A.

FIG. 6 is a flowchart for describing the connection setup process for establishing a connection/communication with the certificate/registration authority 102 performed in step S407 of FIG. 4A by the multi-function peripheral 100 according to the first embodiment. Note that the processing is implemented by the CPU 201 executing a program deployed in the RAM 203, for example.

First, in step S601, the CPU 201 receives a connection setting request from the PC 103. Next, the process advances to step S602, and the CPU 201 obtains the setting values, e.g. the host name and the port number included in the connection setting request, and stores the obtained setting values in the RAM 203 or the HDD 204. Next, the process advances to step S603, and the CPU 201 generates, for example, the HTML data for the Web page screen as shown in FIG. 11A. The process advances to step S604, and the CPU 201 transmits the HTML data generated in step S603 to the PC 103 as a response to the request in step S601 and ends the processing. The process advances to step S408 in this manner.

As a result, as shown in FIG. 11A, a character string 1101 indicating that the settings have been implemented (i.e. the setting values for establishing a connection with the CA/RA 102 are set/applied/effected) is displayed on the PC 103.

The processes shown in the above-described step S406 to step S408 and step S601 to step S604 are the control operations related to the connection setup process of the multi-function peripheral 100.

Next, in step S409 of FIG. 4A, the multi-function peripheral 100 receives a request to display the CA certificate obtainment screen which is transmitted from the browser of the PC 103. In the first embodiment, since the administrator of the multi-function peripheral 100 will obtain the CA certificate issued by the certificate/registration authority 102, assume that the request to display the CA certificate obtainment screen is transmitted to the multi-function peripheral 100 when the administrator clicks CA certificate obtainment 1003 shown in FIG. 10A.

As a result, in step S410, the multi-function peripheral 100 transmits, as a response to the received request in step S409, HTML data of the predetermined CA certificate obtainment screen shown in FIG. 11B.

The connection setup screen shown in FIG. 11B includes an execute button 1102 for instructing the actual obtainment of the CA certificate.

Next, in step S411, the multi-function peripheral 100 receives the CA certificate obtainment request transmitted from the browser of the PC 103 when the execute button 1102 shown in FIG. 11B is clicked. In the first embodiment, assume that the CA certificate obtainment request is transmitted to the multi-function peripheral 100 when the administrator of the multi-function peripheral 100 clicks the execute button 1102 shown in FIG. 11B.

Figure 12A:
Figure 12B:

Next, in step S412, the multi-function peripheral 100 executes/performs processing for generating CA certificate obtainment request data. The process advances to step S413, and the multi-function peripheral 100 transmits the CA certificate obtainment request data generated in step S412 to the certificate/registration authority 102, which is serving as the SCEP server, based on the information set in the connection setup operation performed in step S407. The process advances to step S414, and the multi-function peripheral 100 receives a CA certificate obtainment response which is transmitted from the certificate/registration authority 102. As a result, in step S415, the multi-function peripheral 100 analyses the received CA certificate obtainment response, obtains the CA certificate included in the response, and performs processing to register the obtained CA certificate as a CA certificate trusted by the multi-function peripheral 100. The multi-function peripheral 100 also generates HTML data for a webpage screen for indicating a result/outcome of making the CA certificate obtainment request. The process advances to step S416, and the multi-function peripheral 100 transmits, to the PC 103, a response including a CA certificate obtainment request result. The response includes the HTML data for the Web page screen generated in step S415 and shown in FIG. 12A or 12B as indicators of the result (i.e. outcome of making the request). FIG. 12A shows an example of a screen that is displayed when the obtainment of the CA certificate has been successful and the obtained certificate is registered as the trusted CA certificate. On the other hand, FIG. 12B shows an example of a screen that is displayed when the obtainment of the CA certificate has failed.

FIG. 7 is a flowchart for describing the CA certificate obtainment and registration processes shown in step S412 to step S416 of FIG. 4A and performed by the multi-function peripheral 100 according to the first embodiment in more detail. Note that these processes are implemented by the CPU 201 executing a program deployed in the RAM 203, for example.

First, in step S701, the CPU 201 receives a CA certificate obtainment request from the PC 103. Next, the process advances to step S702, and the CPU 201 generates a CA certificate obtainment request message based on the connection setting (setup) information set for a connection/communication with the certificate/registration authority 102 which was obtained in step S407. An example of the obtainment request message generated in accordance with the first embodiment is shown below. Since SCEP is used as the communication protocol in the first embodiment, the following message is used as a request message using this protocol.

xxxxxxx/
yyyyy?operation=GetCAXyz&message=CAIdentifier

Next, the process advances to step S703, and the CPU 201 controls the network interface controller 205 to connect to the certificate/registration authority 102, which is serving as the SCEP server, by TCP/IP protocol based on the connection setting information for the certificate/registration authority 102 obtained in step S407 of FIG. 4A. Next, the process advances to step S704, and the CPU 201 determines whether or not the connection in step S703 has succeeded. If the connection has succeeded, the process advances to step S705. Otherwise, the process advances to step S714 for performing an error processing step.

In step S705, the CPU 201 transmits the CA certificate obtainment request message generated in step S702 to the certificate/registration authority 102 using, for example, the GET or POST method of HTTP protocol. Next, the process advances to step S706, and the CPU 201 determines whether or not the transmission in step S705 has succeeded. If the transmission has succeeded, the process advances to step S707. Otherwise, the process advances to step S714 for the error processing. In step S707, the CPU 201 (via the network interface controller 205) receives response data from the certificate/registration authority 102, which is sent as a response to the CA certificate obtainment request message. The process advances to step S708, and the CPU 201 determines whether or not the reception of the response data in step S707 has succeeded. If the reception has succeeded, the process advances to step S709. Otherwise, the process advances to step S714. In step S709, the CPU 201 analyses the response data received in step S707 and obtains the data of the CA certificate included in the response data. The analysis of this response data and the obtainment process for the CA certificate are performed by the encryption module 306.

Note that the response data according to the first embodiment is binary data in a X.509 (RFC5280: Internet X.509 Public Key Infrastructure Certificate and Certificate Revocation List (CRL) Profile) format. However, for example, data in a PKCS#7 (RFC5652: Cryptographic Message Syntax) format may be transmitted as a response as well, and it is understood that the data format is not limited to a specific one as long as the CA certificate can be obtained from it.

The process advances to step S710, and the CPU 201 determines whether or not the obtainment of the CA certificate in step S709 has succeeded. If the obtainment has succeeded, the process advances to step S711. Otherwise, the process advances to step S714. In step S711, the CPU 201 registers the CA certificate obtained in step S709 as a CA certificate trusted by the multi-function peripheral 100. The CPU 201 holds (temporarily stores) the obtained CA certificate in the RAM 203 and causes the key pair certificate management module 307 to store the CA certificate in a predetermined directory of the HDD 204 for storing the CA certificate that is trusted by the multi-function peripheral 100. The process advances to step S712, and the CPU 201 determines whether or not the CA certificate registration process in step S711 has succeeded. If the process has succeeded, the process advances to step S713. Otherwise, the process advances to step S714. In step S713, the CPU 201 generates a thumbmark (a hash value obtained using an SHA1 algorithm) of the CA certificate which is to be displayed in a manner as indicated by a character sting 1201 of FIG. 12A when the obtainment and registration of the CA certificate has succeeded. The generation of this thumbmark is executed/performed by the encryption module 306. The process then advances to step S715, and the CPU 201 generates, based on the processing results from step S703 to S714, HTML data for CA certificate obtainment result display data shown in FIG. 12A or 12B as appropriate. The process advances to step S716, and the CPU 201 controls to transmit, to the PC 103, the HTML data generated in step S715 as a response to the received request in step S701 and ends the obtainment and registration processing. Subsequently, the process advances to step S417 of FIG. 4A. In the first embodiment, the character string 1201 of FIG. 12A is displayed in accordance with the CA certificate obtainment and registration result. Alternatively, if the error processing is executed in step S714, a character string 1202 of FIG. 12B is displayed, for example. Next, the description will return to FIG. 4A.

In step S417, the multi-function peripheral 100 receives a request, which is transmitted from the browser of the PC 103, to display the certificate issuance request screen. In the first embodiment, assume that the administrator of the multi-function peripheral 100 will click on a certificate issuance request 1004, shown in FIG. 10A to make a certificate issuance request to the certificate/registration authority 102 in order to obtain a newly issued electronic certificate.

Next in step S418, the multi-function peripheral 100 transmits, as a response to the display request in step S417, HTML data for a predetermined certificate issuance screen, an example of which is shown in FIG. 13A, to the PC 103. As a result, the PC 103 performs a display control to display the screen shown in FIG. 13A.

The certificate issuance request screen of FIG. 13A includes a name 1301 of the certificate, a key length 1302 for setting a key length for a key pair to be generated, an issuance destination information input field 1303, a signature verification 1304 indicating whether a signature which is to be added to a certificate issuance request response transmitted from the certificate/registration authority 102 is to be verified/authenticated, a key application 1305 for setting the application of (i.e. the communication protocol to be used with) the issued certificate, a password 1306 which is to be included in the certificate issuance request, and an execute button 1307 for executing/instructing the certificate issuance request transmission. In this embodiment, the key application 1305 is set as a group of checkboxes and shows that it is possible to set a plurality of applications (i.e. more than one communication protocols) for one certificate.

Next, in step S419, when the certificate issuance request is instructed, for example by clicking on the execute button 1307 of the screen shown in FIG. 13A, the multi-function peripheral 100 receives the certificate issuance request including pieces of input/setting information/data associated with the items referred by respective reference numerals 1301 to 1306 that are set from the browser of the PC 103. In the first embodiment, assume that the administrator of the multi-function peripheral 100 inputs and sets the information associated with the items referred by the respective reference numerals 1301 to 1306 and clicks on the execute button 1307 shown in FIG. 13A to transmit the certificate issuance request instruction from the PC 103 to the multi-function peripheral 100.

Next, in step S420, the multi-function peripheral 100 executes/performs the certificate issuance request (data) generation process. In step S421, the multi-function peripheral 100 transmits, based on the information set in step S407, the certificate issuance request data generated in step S420 to the certificate/registration authority 102, which is serving as the SCEP server. The certificate/registration authority 102 then issues the certificate based on issuance request data and transmits a certificate issuance request response. In step S422, the multi-function peripheral 100 receives the certificate issuance request response transmitted from the certificate/registration authority 102. Next, in step S423, the multi-function peripheral 100 performs analysis and registration processes (executing/performing a signature verification/authentication in accordance with the setting, obtaining the certificate included in the response, and setting/registering the obtained certificate to the designated/ specified application, i.e. to the specified communication protocol) of the certificate issuance request response received in step S422. Subsequently, the multi-function peripheral 100 executes a Web page screen generation process for displaying the result of the certificate issuance request.

Here, if the certificate issuance and the subsequent obtainment of the issued certificate have succeeded, storing and application setting (e.g. communication protocol setting) of the electronic certificate data will be performed by the processing in step S423. Here, the application setting is related to setting settings/parameters for the communication function which uses the electronic certificate, and for the encrypted communication protocols such as TLS, IPSEC, and IEEE802.1X, which are settable/configurable (i.e. available for use dependent on a setting) in the first embodiment. Also, assume that the multi-function peripheral 100 according to the first embodiment can hold/store a plurality of electronic certificates and set one or more application (e.g. one or more communication protocol) for each electronic certificate. For example, different applications (e.g. communication protocols) are settable when an electronic certificate used by the multi-function peripheral 100 to provide a server service (by performing a TLS communication to serve as a Web server) and an electronic certificate used by the multi-function peripheral 100 to perform a client communication (e.g. using IEEE802.1X) differ from each other. However, it is understood that a single electronic certificate may also be applied/used for, all or more than one of the communication applications as appropriate.

In step S424, the multi-function peripheral 100 transmits, to the PC 103, HTML data of the Web page screen shown in FIG. 13B or FIG. 14A which was generated in step S423. Note that a setting-result character string as shown by a character string 1308 in FIG. 13B and a character string 1401 in FIG. 14A will be displayed in accordance with the certificate issuance request result. FIG. 13B shows a view illustrating an example of a screen when certificate issuance and obtainment have succeeded. The screen shown in FIG. 13B is displayed on the PC 103 in a case where a certificate issuance request is transmitted from the PC 103 to the multi-function peripheral 100 and the certificate is issued according to the issuance request. The issued certificate is set as a certificate that is used by the multi-function peripheral 100 to perform a secured communication, in a case where the multi-function peripheral 100 is restarted. A message urging a user to restart the multi-function peripheral 100 is included in the screen shown in FIG. 13B. FIG. 14A shows a view illustrating an example of a screen view when certificate issuance and obtainment have failed. The screen shown in FIG. 14A is displayed on the PC 103 in a case where a certificate issuance request is transmitted from the PC 103 to the multi-function peripheral 100 but the certificate is not issued. A message notifying a user of a failure of issuance of the certificate is included in the screen shown in FIG. 14A.

If certificate issuance and obtainment have succeeded in this manner, storing and application (communication protocol) setting of the electronic certificate data is performed by the process in step S423. Since the communication control module 303 according to the first embodiment obtains the electronic certificate data used in the encrypted communication such as TLS, IPSEC, and IEEE802.1X at the time of an activation of the multi-function peripheral 100 (i.e. the communication control module 303 initialises and establishes an encrypted communication channel, which uses the communication protocol, during the start-up of the multi-function peripheral 100), a restart of the multi-function peripheral 100 is necessary if the changes in the application (the communication protocol and related electronic certificate) are to be effected/implemented.

Figure 8A:
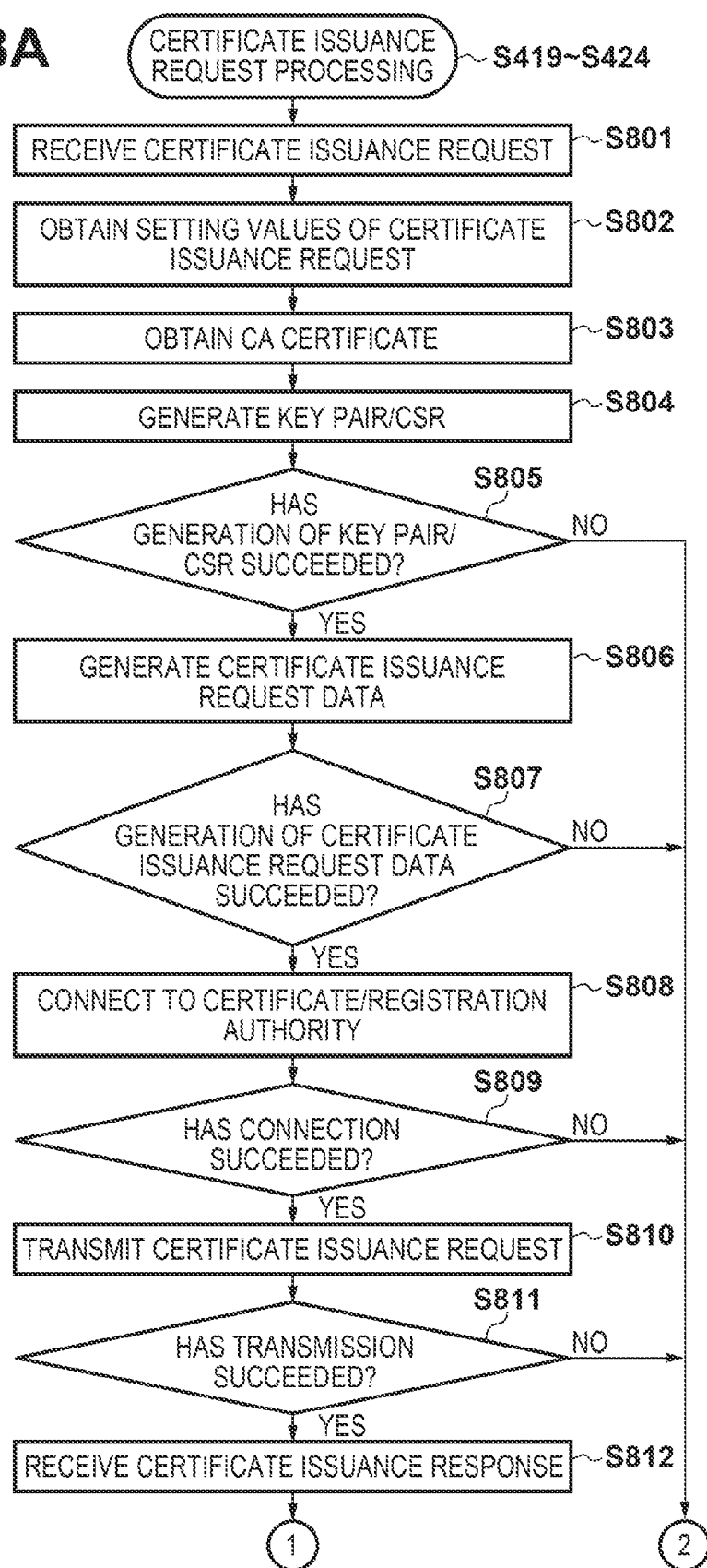

FIGS. 8A and 8B are flowcharts for describing the certificate issuance request/obtainment processing performed in step S419 to step S424 of FIG. 4B by the multi-function peripheral 100 according to the first embodiment in more detail. Note that this processing is implemented by the CPU 201 executing a program deployed in the RAM 203, for example.

First, in step S801, the CPU 201 receives a certificate issuance request from the PC 103 (e.g. via the network interface controller 205). Next, the process advances to step S802, and the CPU 201 obtains setting values of the request, e.g. the information on the name 1301 of the certificate, the key length 1302, the issuance destination information input field 1303, the signature verification 1304, and the key application 1305 included in the certificate issuance request received in step S801. Next, the process advances to step S803, and the CPU 201 obtains the CA certificate obtained in step S412 to step S415 of FIG. 4A. The process advances to step S804, and the CPU 201 performs processing to generate a key pair based on the information of the name 1301 and the key length 1302 obtained in step S802 and to generate certificate signing request (CSR) data of a PKCS#10 (RFC2986: PKCS#10: Certification Request Syntax Specification) format based on the information of the issuance destination information input field 1303 and the password 1306 using the encryption module 306. Next, the process advances to step S805, and the CPU 201 determines whether or not the generation of the key pair/CSR in step S804 has succeeded. If it is determined that the generation has succeeded, the process advances to step S806. Otherwise, the process advances to step S823 for performing an error processing. In step S806, the CPU 201 generates certificate issuance request data (e.g. the CSR data). The CSR data generated in step S806 becomes the PKCS#7-format data defined in the SCEP based on the connection settings set for communicating with the certificate/registration authority 102 obtained in step S407 of FIG. 4A. Next, the process advances to step S807, and the CPU 201 determines whether or not data generation in step S806 has succeeded in generating the certificate issuance request data. If the data generation has succeeded, the process advances to step S808. Otherwise, the process advances to step S823.

In step S808, the CPU 201 executes TCP/IP-protocol connection to the certificate/registration authority 102 serving as a SCEP server based on the connection setting to the certificate/registration authority 102 that was obtained in step S407 of FIG. 4A. Next, the process advances to step S809, and the CPU 201 determines whether or not the connection in step S808 has succeeded. If the connection has succeeded, the process advances to step S810. Otherwise, the process advances to step S823. In step S810, the CPU 201 transmits the CSR data generated in step S806 by the GET or POST method of HTTP protocol to the certificate/registration authority 102. In step S811, the CPU 201 determines whether or not the transmission in step S810 has succeeded. If the transmission has succeeded, the process advances to step S812. Otherwise, the process advances to step S823. In step S812, the CPU 201 receives (e.g. via the network interface controller 205) a certificate issuance response (e.g. including CSR response data) from the certificate/registration authority 102. As the response data is defined by the SCEP, and PKCS#7-format data is transmitted as a response. It is understood that other data formats may also be used.

Next, the process advances to step S813, and the CPU 201 determines whether or not reception of the response data in step S812 has succeeded. If the reception has succeeded, the process advances to step S814. Otherwise, the process advances to step S823. In step S814, the CPU 201 determines whether or not a signature verification is needed by, for example, determining whether a signature verification setting is present based on the information on the signature verification 1304 obtained in step S802. If the signature verification is to be performed, the process advances to step S815. Otherwise, the process advances to step S817. In step S815, the CPU 201 controls to verify/authenticate the signature data added to the response data received in step S812 using the public key included in the CA certificate obtained in step S803. The process advances to step S816, and the CPU 201 determines whether or not the result of the signature verification in step S815 is successful (i.e. the signature has been verified/authenticated as authentic/valid). If the signature verification has succeeded, the process advances to step S817. Otherwise, the process advances to step S823.

In step S817, the CPU 201 controls to analyse the response data received in step S812 and obtain certificate data included in the response data. The response data analysis and certificate obtainment processes are performed by the encryption module 306, for example. Next, in step S818, the CPU 201 determines whether or not certificate obtainment in step S817 has succeeded. If the certificate obtainment has succeeded, the process advances to step S819. Otherwise, the process advances to step S823. In step S819, the CPU 201 registers the certificate obtained in step S818 as the electronic certificate (i.e. digital certificate) corresponding to the key pair generated in step S804. At the same time, the CPU 201 causes/controls the key pair certificate management module 307 to store the public key pair generated in step S804 and the obtained electronic certificate in a predetermined directory of the HDD 204 for storing the key pair/electronic certificate. The key pair certificate management module 307 also adds the information on the public key pair generated in step S804 and the obtained electronic certificate to the key pair certificate detailed information list as shown in FIG. 17B. In FIG. 17B, a new key pair/certificate Xyz4 has been added.

Next, the process advances to step S820, and the CPU 201 determines whether or not the certificate registration process in step S819 has succeeded. If the registration has succeeded, the process advances to step S821. Otherwise, the process advances to step S823. In step S821, the CPU 201 sets settings for an application that is going to use the certificate based on the information on the key application 1305 obtained in step S802. For example, the key pair certificate management module 307 updates the application information (e.g. information on the communication protocol) in the key pair/certificate detailed information list as shown in FIG. 17C. In FIG. 17C, the key pair/certificate to be used in TLS has been changed from Xyz1 (in FIG. 17B) to Xyz4. Next, the process advances to step S822. The CPU 201 determines whether or not the application setting (e.g. update of the electronic certificate) in step S821 has succeeded. If the application setting (e.g. the update) has succeeded, the process advances to step S824. Otherwise, the process advances to step S823.

In step S824, the CPU 201 generates HTML data for the certificate issuance request result, as shown in FIG. 13B, which corresponds to a result/outcome of the processing from step S801 to step S823. In step S825, the CPU 201 controls to transmit the HTML data generated in step S824 to the PC 103 as a response to the certificate issuance request of step S801 and ends the certificate issuance request/obtainment processing. Subsequently, the process advances to step S425 of FIG. 4B.

The processes of above-described step S419 to step S424 and step S801 to step S825 form parts of control operations related to the electronic certificate issuance request and its response processing and the communication (protocol) application setting of the multi-function peripheral 100. In the first embodiment, these processes performed from the issuance request and response processing to the communication protocol application setting are collectively refereed to as "the electronic certificate automatic update function".

By executing this electronic certificate automatic update function, the multi-function peripheral 100 can automatically perform the electronic certificate issuance request and response processing via the network and also set the application (e.g. the communication protocol) of the received electronic certificate. This can reduce the user's workload. The description will return to FIG. 4B.

In step S425, the multi-function peripheral 100 receives a request to restart the multi-function peripheral 100. In the first embodiment, assume that the administrator of the multi-function peripheral 100 restarts the multi-function peripheral 100 by clicking on a restart button 1309 shown in FIG. 13B.

Next, the process advances to step S426, and the multi-function peripheral 100 transmits, as a response to the restart request in step S425, HTML data of the predetermined restart execution screen shown, for example as in FIG. 14B. Next, the process advances to step S427, and the multi-function peripheral 100 executes/performs the restart process for the multi-function peripheral 100.

The multi-function peripheral 100 according to the first embodiment has been described under the assumption that a restart is necessary to effect any changes made to the application settings, e.g. when setting a communication protocol (application) for the received electronic certificate to IEEE802.1X. This is because, for example, an electronic certificate for IEEE802.1X may be deployed/initialised in the RAM 203 at the time of an activation/start-up of the multi-function peripheral 100 and may be in use continuously, which means it may not be replaced by the received electronic certificate that has been stored in the HDD 204. However, if it is possible to switch/change the electronic certificate that is to be used for the application using that particular communication protocol without the restart of the multi-function peripheral 100, it may be set so that the restart is not performed. For example, if the application is set for TLS, it may be set so that the restart is deemed unnecessary. For example, it is possible to preset an indicator regarding the necessity of a restart for each of the plurality of applications, and the multi-function peripheral 100 may automatically determine whether to restart in accordance with this restart necessity indicator information. In another example, the PC 103 may store such restart necessity indicator information, and determine whether to transmit, to the multi-function peripheral 100, the restart request or not based on it.

FIG. 9 is a flowchart for describing the process related to the restart of the multi-function peripheral 100 in step S425 to step S427 of FIG. 4B performed by the multi-function peripheral 100 according to the first embodiment. Note that this processing is implemented by the CPU 201 executing a program deployed in the RAM 203, for example.

First, in step S901, the CPU 201 receives a request to restart the multi-function peripheral 100 from the PC 103 (e.g. via the network interface controller 205). Next, the process advances to step S902, and the CPU 201 transmits (e.g. via the network interface controller 205), to the PC 103 as a response to the restart request in step S901, predetermined HTML data for the restart request of the multi-function peripheral 100 shown in FIG. 14B. Next, the process advances to step S903. The CPU 201 instructs/causes/controls the device control module 310 to start the restart process and ends the restart processing.

By performing the sequence of operations described above, it is possible to use the electronic certificate obtained from the certificate/registration authority 102 in the restarted multi-function peripheral 100.

FIG. 15 depicts a view showing an example of a screen view when the key pair/electronic certificate list is displayed by executing the processing of step S401 to step S403 again after the certificate issuance and obtainment have succeeded. Information 1501 of the certificate Xyz4 newly issued by the certificate/registration authority 102 has been added to this list.

The overall process sequence from the process steps for the initial setup (setting) related to the electronic certificate issuance request, the display of the information regarding the electronic certificate, the issuance request and the reception of the issued electronic certificate, to the process for restarting the multi-function peripheral and the effecting/implementation/enabling of the issued electronic certificate according to the first embodiment has been described above.

Note that although the sequence of the processing shown in FIGS. 4A and 4B has been described with the processes involved from the initial connection setup in steps S404-S408 to the issuance request and effecting/implementation/enabling of the issued electronic certificate in steps S419-S427 as a single serial sequence of operations, the processes related to the initial connection setup operation (steps S401-S418) such as the connection setting in steps S404-S408 may be just performed once for the multi-function peripheral 100, and not repeated thereafter unless a specific need for a connection with another CA or an update in the connection setting values arises. For example, the setting operations of the displaying of the electronic certificate information in step S401 to step S403, the initial connection setup process in step S404 to step S408, and the CA certificate obtainment process of step S409 to step S418 may be performed for only the first certificate issuance request. Then it may be operated so that the same settings are used for the second and any subsequent electronic certificate issuance requests. In other words, at the time of performing the second or subsequent electronic certificate update/issuance, it may be operated so as to execute only the processing steps related to the electronic certificate issuance request and its response processing and the processes related to the communication application settings in step S419 to step S424, and, if required, the restart and implementation/enabling processing of step S425 to step S427.

In the first embodiment, the multi-function peripheral 100 receives processing instructions from the PC 103 via the Web-page-format RUIs held by (i.e. stored in) the multi-function peripheral 100 itself and performs controls based on these instructions. However, the interface used to receive an instruction from the administrator to the multi-function peripheral 100 is not particularly limited to such an arrangement. Each instruction may be received from a local user interface (LUI) provided on the multi-function peripheral 100 itself or on another device connected to the multi-function peripheral 100 (e.g. the printer 210 or the scanner 211) using the printer 210 held by the multi-function peripheral 100 instead of each Web-page-format RUI, for example.

In addition, instead of the administrator manually making a request by operating the Web-page-format RUI directly, it may be arranged so that a request can be automatically input and instructed from a PC or another management server to the multi-function peripheral 100 by, for example, creating a template for each Web-page input region and a rule for each Web-page operation instruction in advance. In this case, for example, a Web scraping (data mining) technique may be used.

Also, although the first embodiment has an arrangement in which the operation for obtaining and registering a CA certificate is performed by the administrator of the multi-function peripheral 100, it may have an arrangement in which the CA certificate is, when needed, automatically obtained at the time of the first, or any subsequent, certificate issuance request.

Also, the first embodiment has been provided with a signature verification setting (for indicating whether to perform a signature verification) included in the certificate issuance request response from the certificate/registration authority 102. However, instead of providing this settable/adjustable setting, it may be preset so as to always perform the signature verification or not perform the signature verification.

In addition, although the first embodiment has an arrangement in which a password is included as data in the certificate issuance request (e.g. the password is included in the CSR), it may have an arrangement in which the password is unnecessary (e.g. not used).

As described above, according to the first embodiment, a certificate addition/update request (e.g. the certificate issuance request) can be issued to an external apparatus such as a certificate/registration authority by using a certificate automatic update protocol (i.e. the electronic certificate automatic update function) based on an instruction from an RUI. Then, based on the response corresponding to the request, a certificate can be received and registered in the multi-function peripheral, and various settings or parameters for running an application using the certificate can be set.

Second Embodiment

The second embodiment of the present invention will be described next. In the aforementioned first embodiment, a Web-page-format RUI was provided to the user of the multi-function peripheral 100 by using the Web server function held by the multi-function peripheral 100. The user added, updated, and set various settings or parameters for running an application which is to use the electronic certificate by giving instructions to the multi-function peripheral 100 via the RUI. Since this electronic certificate has a validity period, an electronic certificate for which the validity period has expired is disabled. This can disrupt network communication since a correct communication authentication cannot be performed with a disabled electronic certificate. Hence, when the validity period of the electronic certificate held by (stored in) a device is near its expiration time/date or has expired, the electronic certificate needs to be updated. However, if there are a plurality of devices using the electronic certificate, it is difficult for the administrator of the devices to obtain/access/discern/grasp the validity period of the electronic certificate of each device and to update each electronic certificate individually/accordingly.

Therefore, the second embodiment will describe, an information processing apparatus which is capable of performing an electronic certificate automatic update function such as that in the first embodiment, a control/management operation that automatically activates the electronic certificate update function at a predetermined date and time (i.e. at a reserved time), instead of manually controlling each update based on a user instruction. Note that in the second embodiment, the network arrangement, the hardware arrangement, the software arrangement, the key pair/electronic certificate list display processing, the connection setup process of the multi-function peripheral 100 as the information processing apparatus are the same as those of the first embodiment, and a description thereof are omitted.

FIG. 18 depicts a view showing an example of an electronic certificate update reservation setting screen provided for the multi-function peripheral 100 according to the second embodiment. This screen is shown, for example, by a Web-page-format RUI in the same manner as the other screens described herein. An update date and time (i.e. a reserved or predetermined time) for the electronic certificate can be set via this electronic certificate update reservation setting screen. In the second embodiment, it is possible to set, as the update date and time (and update interval designation where appropriate), three settings of: an update date and time 1801; a time period 1802 prior to the expiration of the validity period; and a time period between intervals or a date for defining a cycle 1803. In the update date and time 1801, the year, the month, the day, and the time for the update can be set, and when the current time held in (e.g. observed/measured by) the multi-function peripheral 100 changes to the set time and date of this update date and time 1801, the electronic certificate automatic update function is executed. The time period 1802 designates a number of days before the expiry of the validity period of the currently used electronic certificate. If the days from the current time and date held in (i.e. observed/measured by) the multi-function peripheral 100 to the validity period becomes equal to or less than the number of days designated by the time period 1802, the electronic certificate automatic update function is executed. The time period/date 1803 executes the electronic certificate automatic update function based on a cycle as defined by this time period/date. In the second embodiment, this cycle can be set based on a predetermined number of days (i.e. a time period), a predetermined day of each month, or a predetermined day and month of each year (i.e. date). This setting (or reserving) of the update date and time or the update cycle of each electronic certificate's update is called "an electronic certificate update reservation setting". When the update reservation setting of each electronic certificate is updated, the CPU 201 stores the updated reservation information in an HDD 204.

FIG. 18 shows, in the time period 1802, an example of a screen where it has been set to execute the electronic certificate automatic update function when the date becomes 14 days before the expiration of the validity period. Although the above-described electronic-certificate update reservation setting types are used to make a reservation for performing the electronic certificate automatic update operation/function in the second embodiment, it is understood that the present invention is not limited to this. Another time and/or date or timing designation/reservation method may also be used as long as it can define a condition or a point/period in time for performing/executing this operation.

FIG. 19 is a flowchart for describing the processing performed when the electronic certificate automatic update function is to be executed based on the electronic-certificate update reservation setting set on the multi-function peripheral 100 according to the second embodiment. Although an example in which the automatic update function has been set for the multi-function peripheral 100 is shown here, it is possible to execute the process shown in FIG. 19 on a plurality of multi-function peripherals by designating the plurality of multi-function peripherals (it is also possible to set a different time or condition for performing/executing the automatic update operation for each multi-function peripheral). In this case, the processes of FIG. 19 are executed in parallel among the plurality of multi-function peripherals. Note that the processing is implemented by the CPU 201 executing a program deployed in a RAM 203, for example.

First, in step S1901, the CPU 201 obtains the electronic certificate update reservation setting from the HDD 204. Next, the process advances to step S1902, and the CPU 201 obtains the information on the currently used electronic certificate. This information is information such as that indicated in FIGS. 17A to 17C. Next, the process advances to step S1903, and the CPU 201 obtains the current time and date observed/measured by the multi-function peripheral 100. It is understood that time differences among different time zones may also be taken into account here. Next, the process advances to step S1904, and the CPU 201 compares the electronic certificate update reservation setting and the obtained electronic certificate information to determine whether or not the currently used electronic certificate needs to be updated. Here, if it is determined that the electronic certificate need not be updated, the process returns to step S1901. The process may wait for a predetermined period, or until another predetermined condition has been met before returning to step S1901. On the other hand, if it is determined that the electronic certificate needs to be updated, the process advances to step S1905 and the process advances to the "certificate issuance request processing" control described in FIGS. 8A and 8B. After the processing of FIGS. 8A and 8B is completed, the process advances to step S1906.

According to the above-described process, it is possible to automatically update the electronic certificate based on a designated/preset update date and time or an update cycle without a manual instruction from the user. This allows the electronic certificate of each device to be maintained, i.e. updated at a desirable timing, while reducing the user's workload, and without requiring the administrator to grasp/discern/determine the validity period of the electronic certificate of each device.

In step S1906, the CPU 201 determines, upon updating the electronic certificate, whether the multi-function peripheral 100 needs to be restarted. Here, if the CPU 201 determines that a restart is necessary, the process advances to step S1907 to execute the "restart/setting implementation/enabling process" shown in FIG. 9. On the other hand, if the CPU 201 determines that the restart is unnecessary, it ends the automatic update operation processing. This is to control the restart of the multi-function peripheral 100 so that it is restarted only when necessary. For example, this differentiates between cases where the multi-function peripheral 100 has switched the electronic certificate to be used and the network configuration is changed for TLS, which does not require a restart, and for IEEE802.1X which requires restart.

As described above, according to the second embodiment, by reserving/specifying/defining the update timing of the electronic certificate, it is possible for the multi-function peripheral to automatically transmit an electronic certificate issuance request to update and register an electronic certificate without user instruction. As a result, even when the user is not aware of (e.g. due to not having access to such knowledge/information) the validity period of the electronic certificate, it is possible to prevent a situation in which the electronic certificate is disabled (e.g. because it has expired) and the network communication is disrupted.

Other Embodiments

Embodiments of the present invention can also be realized by a computer of a system or apparatus that reads out and executes computer executable instructions (e.g., one or more programs) recorded on a storage medium (which may also be referred to more fully as a '(non-transitory) computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to embodiments, it is to be understood that the invention is not limited to the disclosed embodiments. It will be appreciated by those skilled in the art that various changes and modification might be made without departing form the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive.

This application claims the benefit of Japanese Patent Application No. 2017-028424, filed Feb. 17, 2017, which is hereby incorporated by reference herein in its entirety.

What is claimed is:

1. An information processing system comprising:
one or more controllers including one or more processors and one or more memories, the one or more controllers being configured to:
transmit an electronic certificate issuance request to an external apparatus;
receive an electronic certificate issued by the external apparatus in accordance with the electronic certificate issuance request from the external apparatus;
update an electronic certificate stored in a storage with the received electronic certificate; and
set whether an electronic certificate automatic updating is enabled or not via a user interface, wherein, in the electronic certificate automatic updating, the electronic certificate issuance request is repeatedly transmitted to the external apparatus at an interval and the electronic certificate is received from the external apparatus and the electronic certificate stored in the storage is updated with the received electronic certificate,
wherein the one or more controllers are configured to repeatedly execute transmitting the electronic certificate issuance request to the external apparatus at an interval, receiving the electronic certificate from the external apparatus and updating the electronic certificate stored in the storage in a case where the electronic certificate automatic updating is set to be enabled, without executing transmitting repeatedly the electronic certificate issuance request to the external apparatus at an interval in a case where the electronic certificate automatic updating is not to set to be enabled.

2. The information processing system according to claim 1, wherein the one or more controllers are further configured to set an intended use of the received electronic certificate.

3. The information processing system according to claim 1, wherein the one or more controllers are further configured to set a communication protocol of the received electronic certificate.

4. The information processing system according to claim 3, wherein the one or more controllers are further configured to perform an encryption communication with an apparatus connected to the information processing apparatus using the set communication protocol.

5. The information processing system according to claim 3, wherein the communication protocol includes at least one of TLS (Transport Layer Security), IPSEC (Internet Protocol Security), IEEE802.1X.

6. The information processing system according to claim 1, wherein the one or more controllers are further configured to verify a digital signature included in the received electronic certificate,
wherein, in a case that it is verified that the digital signature included in the received electronic certificate has been issued by the external apparatus, the one or more controllers are configured to update, in the updating, the electronic certificate stored in the storage with the received electronic certificate.

7. The information processing system according to claim 6, wherein the one or more controllers are further configured to obtain a CA (Certificate Authority) certificate from the external apparatus,
wherein, in the verifying, the one or more controllers are configured to verify the digital signature included in the received electronic certificate using the obtained CA certificate.

8. The information processing system according to claim 1, wherein the one or more controllers are further configured to display a screen for setting a connection with the external apparatus and perform setting of connection with the external apparatus in accordance with contents set via the screen,
wherein, in the transmitting, the one or more controllers are configured to transmit the electronic certificate issuance request to the external apparatus set by the setting of connection.

9. The information processing system according to claim 1, wherein the one or more controllers are further configured to cause an apparatus connected to the information processing apparatus via a network to display a screen for instructing to transmit the electronic certificate issuance request, wherein a transmission of the electronic certificate issuance request is activated by the connected apparatus that receives an instruction input via the screen.

10. The information processing system according to claim 1, further comprising:

a display, wherein the one or more controllers are configured to set an update date and time of the electronic certificate and the update cycle of the electronic certificate via the user interface.

11. The information processing system according to claim 1, wherein the user interface is configured to not allow to accept a setting of the interval via the user interface in a case where the electronic certificate automatic updating is not set to be enabled.

12. The information processing system according to claim 1, wherein the user interface is configured to allow to accept a setting of the interval and the interval is set via the user interface, in a case that the electronic certificate automatic updating is set to be enabled.

13. The information processing system according to claim 1, wherein the interval is operable to be set to be shorter than a validity period of the received electronic certificate.

14. The information processing system according to claim 1, wherein the interval is different from a validity period of the electronic certificate stored in the storage, and is set via the user interface.

15. A method of controlling an information processing system that performs communication using an electronic certificate, the method comprising:

transmitting an electronic certificate issuance request to an external apparatus;

receiving an electronic certificate issued by the external apparatus in accordance with the electronic certificate issuance request from the external apparatus;

updating an electronic certificate stored in a storage with the received electronic certificate;

setting whether an electronic certificate automatic updating is enabled or not via a user interface, wherein, in the electronic certificate automatic updating, the electronic certificate issuance request is repeatedly transmitted to the external apparatus at an interval and the electronic certificate is received from the external apparatus and the electronic certificate stored in the storage is updated with the received electronic certificate; and repeatedly executing transmitting the electronic certificate issuance request to the external apparatus at an interval, receiving the electronic certificate from the external apparatus and updating the electronic certificate stored in the storage in a case where the electronic certificate automatic updating is set to be enabled, without executing transmitting repeatedly the electronic certificate issuance request to the external apparatus at an interval in a case where the electronic certificate automatic updating is not to set to be enabled.

16. The method according to claim 15, further comprising:

setting an intended use of the received electronic certificate.

17. The method according to claim 15, further comprising:

setting a communication protocol of the received electronic certificate.

18. The method according to claim 17, further comprising:

performing an encryption communication with an apparatus connected to the information processing apparatus using the communication protocol set in the setting.

19. The method according to claim 17, wherein the communication protocol includes at least one of TLS (Transport Layer Security), IPSEC (Internet Protocol Security), IEEE802.1X.

20. A non-transitory computer readable storage medium storing a program for causing a computer to execute:

transmitting an electronic certificate issuance request to an external apparatus;

receiving an electronic certificate issued by the external apparatus in accordance with the electronic certificate issuance request from the external apparatus;

updating an electronic certificate stored in a storage with the received electronic certificate;

setting whether an electronic certificate automatic updating is enabled or not via a user interface, wherein, in the electronic certificate automatic updating, the electronic certificate issuance request is repeatedly transmitted to the external apparatus at an interval and the electronic certificate is received from the external apparatus and the electronic certificate stored in the storage is updated with the received electronic certificate; and repeatedly executing transmitting the electronic certificate issuance request to the external apparatus at an interval, receiving the electronic certificate from the external apparatus and updating the electronic certificate stored in the storage in a case where the electronic certificate automatic updating is set to be enabled, without executing transmitting repeatedly the electronic certificate issuance request to the external apparatus at an interval in a case where the electronic certificate automatic updating is not to set to be enabled.

* * * * *